(12) United States Patent
Cassidy et al.

(10) Patent No.: US 12,282,703 B2
(45) Date of Patent: Apr. 22, 2025

(54) COMPUTERIZED SYSTEMS AND METHODS FOR HOSTING AND DYNAMICALLY GENERATING AND PROVIDING CUSTOMIZED MEDIA AND MEDIA EXPERIENCES

(71) Applicant: SUPER HI FI, LLC, Los Angeles, CA (US)

(72) Inventors: Brendon Patrick Cassidy, Venice, CA (US); Zack J. Zalon, Sherman Oaks, CA (US)

(73) Assignee: SUPER HI FI, LLC, Los Angeles, CA (US)

( * ) Notice: Subject to any disclaimer, the term of this patent is extended or adjusted under 35 U.S.C. 154(b) by 30 days.

(21) Appl. No.: 18/313,944

(22) Filed: May 8, 2023

(65) Prior Publication Data

US 2023/0273766 A1     Aug. 31, 2023

Related U.S. Application Data

(63) Continuation of application No. 17/210,177, filed on Mar. 23, 2021, now Pat. No. 11,669,296, which is a continuation-in-part of application No. 16/717,096, filed on Dec. 17, 2019, now Pat. No. 10,990,350, which is a continuation of application No. 15/336,627, filed on Oct. 27, 2016, now Pat. No. 10,509,622.

(60) Provisional application No. 62/993,911, filed on Mar. 24, 2020, provisional application No. 62/993,850, filed on Mar. 24, 2020, provisional application No. 62/993,486, filed on Mar. 23, 2020, provisional application No. 62/393,522, filed on Sep. 12, 2016, (Continued)

(51) Int. Cl.
| | | |
|---|---|---|
| *G06F 3/16* | (2006.01) | |
| *G05B 15/02* | (2006.01) | |
| *G10L 25/48* | (2013.01) | |
| *G11B 27/036* | (2006.01) | |
| *G11B 27/28* | (2006.01) | |

(52) U.S. Cl.
CPC ............. *G06F 3/165* (2013.01); *G05B 15/02* (2013.01); *G06F 3/16* (2013.01); *G10L 25/48* (2013.01); *G11B 27/036* (2013.01); *G11B 27/28* (2013.01)

(58) Field of Classification Search
None
See application file for complete search history.

(56) References Cited

U.S. PATENT DOCUMENTS 10,057,705 B2 *  8/2018  Brockmole .............. G10H 1/18
10,225,029 B2 *  3/2019  Armstrong ............. H04H 40/27
(Continued)

*Primary Examiner* — Hemant S Patel
(74) *Attorney, Agent, or Firm* — Greenberg Traurig, LLP

(57) ABSTRACT

Disclosed are systems, servers and methods for providing a novel framework that enables the unique cataloging and organization of audio files, upon which audio rendering experiences can be created and provided to requesting users, whether the users are individuals or third-party partners. The disclosed framework enables audio files to be stripped down, uniquely stored, and then stitched together in a novel manner that previously did not exist within the computing arts. The disclosed systems and methods, therefore, provide a novel platform where audio is not just provided to consumers, but audio experiences are compiled from various types of audio formats and types in a unique, dynamically determined manner for a listening user.

18 Claims, 18 Drawing Sheets

Related U.S. Application Data provisional application No. 62/254,072, filed on Nov. 11, 2015, provisional application No. 62/246,849, filed on Oct. 27, 2015.

(56) References Cited

U.S. PATENT DOCUMENTS

| | | |
|---|---|---|
| 11,669,296 B2 * | 6/2023 | Cassidy .................... G06F 3/16 |
| | | 700/94 |
| 2006/0095262 A1 | 5/2006 | Danieli |
| 2008/0092721 A1 | 4/2008 | Schnepel et al. |
| 2009/0083047 A1 | 3/2009 | Lindahl et al. |
| 2010/0280638 A1 * | 11/2010 | Matsuda ................. G06F 3/165 |
| | | 700/94 |
| 2012/0177342 A1 | 7/2012 | Hashimoto et al. |
| 2015/0358690 A1 | 12/2015 | Thompson et al. |
| 2020/0073625 A1 | 3/2020 | Zalon et al. |

* cited by examiner

FIG. 7A

| Candidate section 705 | Restriction section 708 | Candidate section 705 |
|---|---|---|

| Candidate section 705 | Restriction section 708 | Candidate section 705 |
|---|---|---|

700

Overlay content 728

FIG. 8

| Candidate section 705 | Restricted section 708 | Candidate section 705 |
|---|---|---|

800

Mixed section 803

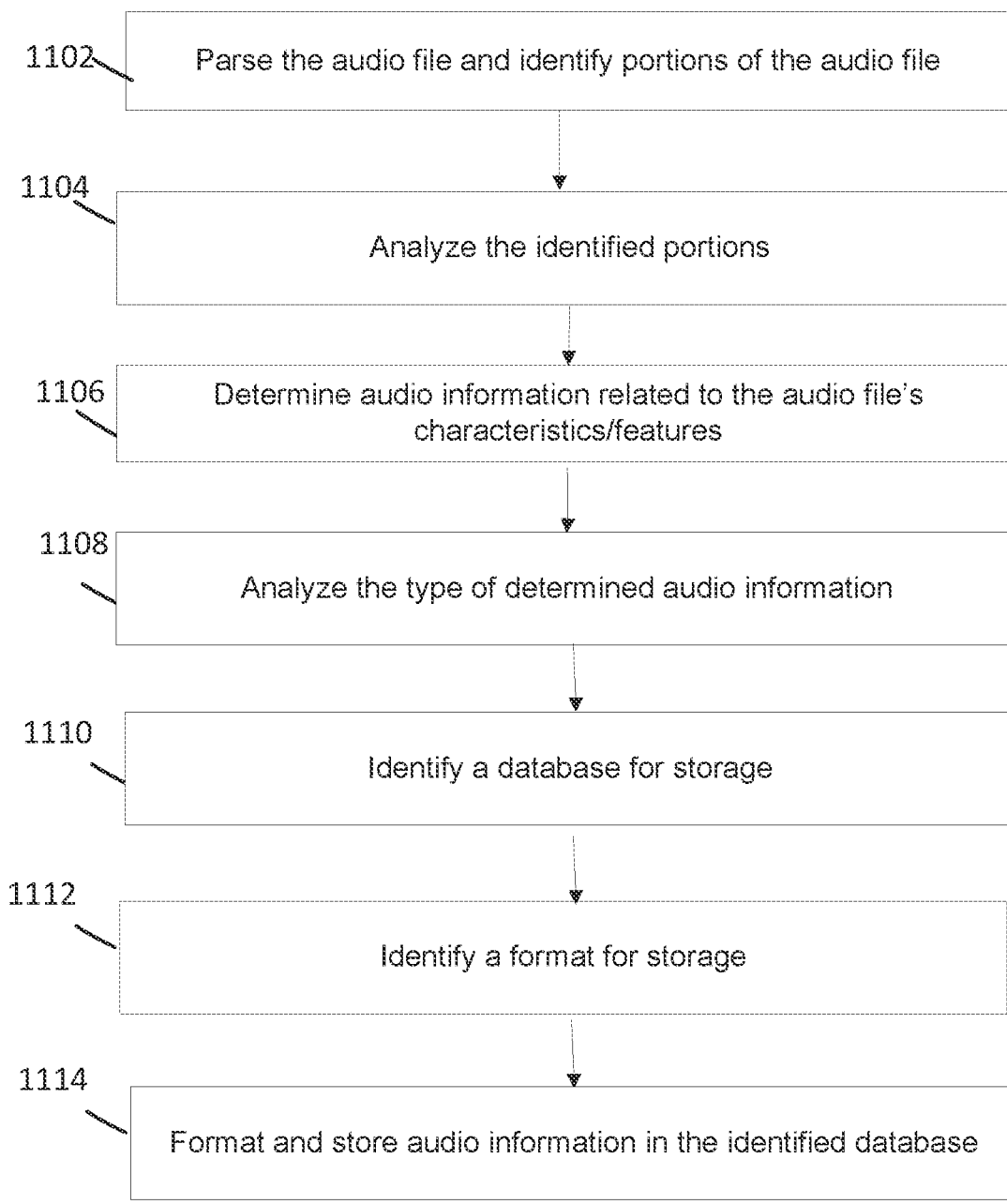

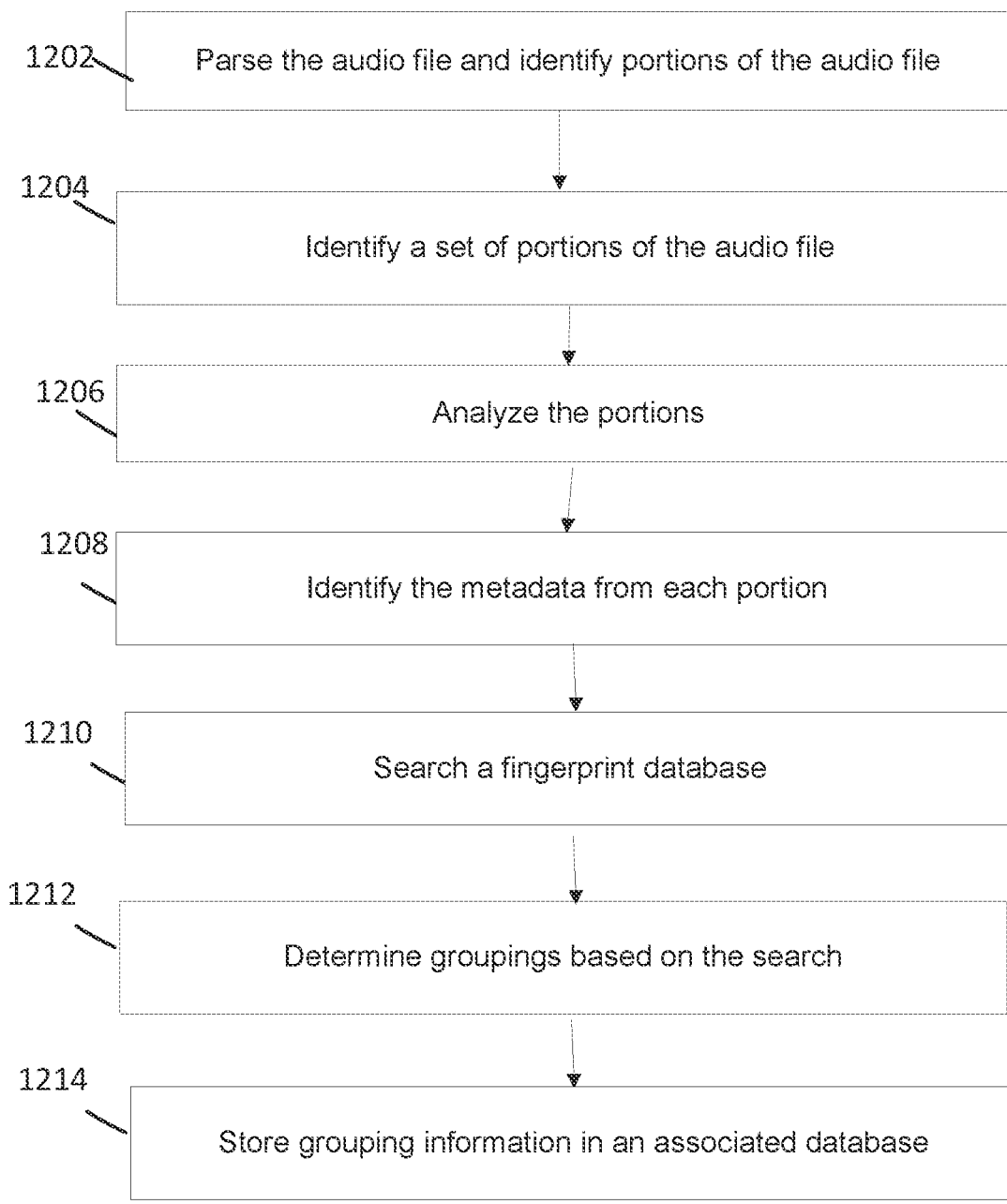

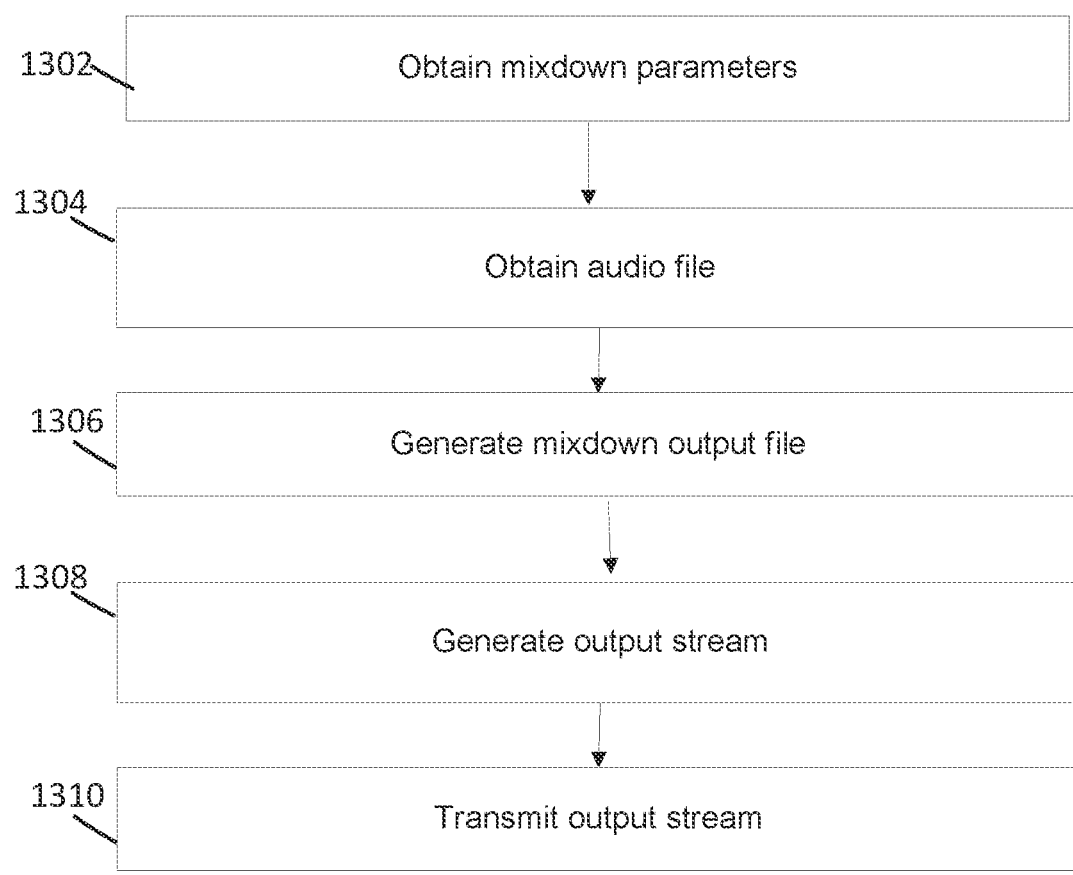

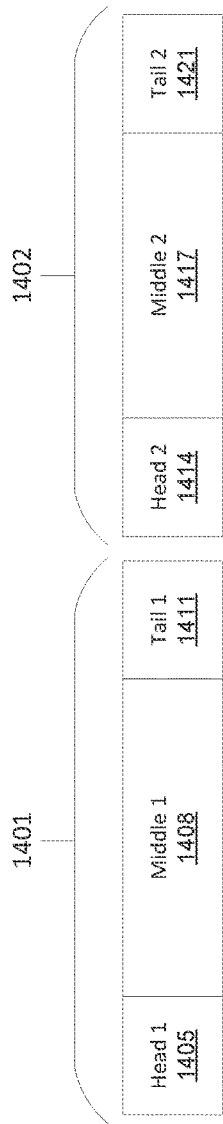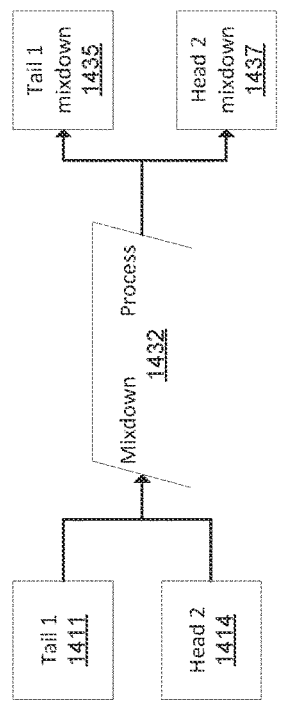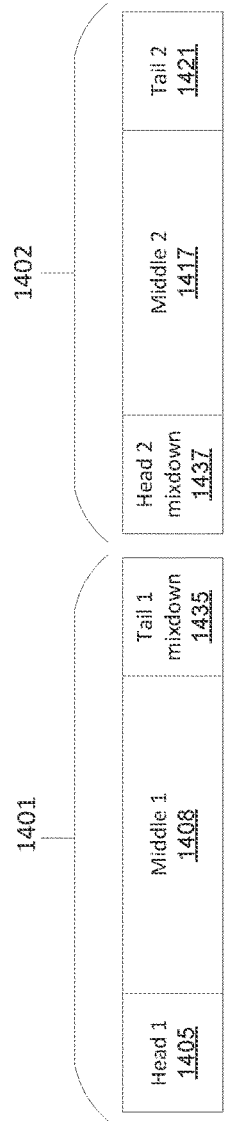
FIG. 14A
FIG. 14B
FIG. 14C

COMPUTERIZED SYSTEMS AND METHODS FOR HOSTING AND DYNAMICALLY GENERATING AND PROVIDING CUSTOMIZED MEDIA AND MEDIA EXPERIENCES

CROSS-REFERENCE TO RELATED APPLICATIONS

This application is a continuation of U.S. patent application Ser. No. 17/210,177, filed Mar. 23, 2021, entitled "Computerized Systems And Methods For Hosting And Dynamically Generating And Providing Customized Media And Media Experiences," which claims the benefit of and priority to U.S. Provisional Application No. 62/993,486, filed Mar. 23, 2020, entitled "Server, System And Method For Analyzing Files To Determine Overlay Suitability," from U.S. Provisional Application No. 62/993,911, filed Mar. 24, 2020, entitled "System, Server And Method For Generating Files For Improved User Experiences," and from U.S. Provisional Application No. 62/993,850, filed Mar. 24, 2020, entitled "Server, System Ad Method For Content Generation, which are incorporated herein by reference in their entirety.

This application is also a continuation-in-part of U.S. patent application Ser. No. 16/717,096, filed Dec. 17, 2019, now U.S. Pat. No. 10,990,350, entitled "Audio Content Production, Audio Sequencing, and Audio Blending System and Method," which is a continuation application of U.S. patent application Ser. No. 15/336,627, filed Oct. 27, 2016, now U.S. Pat. No. 10,509,622, entitled "Audio Content Production, Audio Sequencing, And Audio Blending System And Method", which claims the benefit of and priority to U.S. Provisional Application No. 62/246,849, filed Oct. 27, 2015, entitled "Audio Content Blending System And Method", U.S. Provisional Application No. 62/254,072, filed Nov. 11, 2015, entitled "Production Content Creation Server, System and Method", and U.S. Provisional Application No. 62/393,522, filed Sep. 12, 2016, entitled "Audio Content Sequencing", which are incorporated herein by reference in their entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

Digital and internet radio services have globally transformed the delivery of audio content. The widespread use of digital formats, such as, for example, compressed digital content, has provided broadcasters and other content providers with an almost infinite selection of content for a wide variety of uses. However, typical digital content experiences suffer from playback gaps and other inartful characteristics which undermine the listening experience and provide decision points for listeners to abandon listening to the broadcast or other content.

Conversely, existing terrestrial radio stations and broadcast networks have stagnated in their adoption of digital technologies, sometimes relying on tools and techniques that are decades old and require humans to do tedious, repetitive, and menial tasks. In addition, maintaining the quality of their product is a constant struggle, with even the most well-funded stations falling victim to human error and lesser-skilled labor. These factors put them at a competitive disadvantage to new digital delivery platforms.

SUMMARY

Some embodiments comprising a method for analyzing, by a computing device, an audio file, and determining attributes of the audio file, the attributes comprising information related to features of the audio file. Some embodiments further include determining, using the computing device, portions of the audio file that are eligible for mixing and portions that are ineligible; and generating, using the computing device, instructions for mixing audio data consistent with the determinations of the eligible and ineligible portions.

In some embodiments, the instructions are used to generate a stream of audio data that is output to a file or delivered to a network.

In some embodiments, the instructions are used to generate a stream of audio data which is sequenced to enable hitting the post at the beginning of an ineligible portion.

In some embodiments, the audio data mixing includes a sequence determination that is based on a set of formulae, the formulae comprising information for ordering audio data at predetermined times or intervals.

Some embodiments further comprise receiving input parameters from a user, the input parameters corresponding to at least some of the features and characteristics of the audio file.

In some embodiments, the stream is a basis for a broadcast station.

Some embodiments further include at least one multidimensional database that comprises a plurality of data structures for specific types of the audio features.

In some embodiments, the stream comprises song content and voice-over content.

In some embodiments, the audio file comprises third party content.

Currently, there does not exist a service, platform or provider that can be configured to provide customized audio rendering experiences that are fully automated and seamlessly rendered versions of audio content. Beyond simply providing streams of music files that are retrofitted to understood behaviors or preferences of a user, conventional systems lack the intelligence to provide a listening experience that includes various types and formats of audio compiled based not only on settings/parameters, but also the deep features discovered and understood from the audio included (or to be included) in a stream or other production or broadcast.

Some embodiments of the disclosed systems, servers and methods address one or more of these shortcomings, among others, by providing an improved infrastructure that enables the unique cataloging and organization of audio files and their subparts, upon which audio rendering experiences can be created and provided to requesting users, whether the users are individuals or third-party partners. As discussed herein, the disclosed framework enables audio files to be stripped down, uniquely stored, and then stitched together in a manner that previously did not exist within the computing arts. The disclosed systems and methods, therefore, provide a novel platform where audio is not just provided to consumers, but audio and listening experiences are generated and compiled from various types of audio formats and types in a unique, dynamically determined manner for a listening user. As discussed herein, the listening experiences are provided in a manner that accounts for data, instructions or some combination thereof, from users, content providers and the trained computer-models that are being implemented to create and provide the listening experiences.

According to some embodiments, a computer-implemented method is disclosed, and includes steps including: receiving, by a computing device, over a network, a request to generate a stream of audio files, the request identifying at least an audio file; analyzing, by the computing device, the audio file, and determining attributes of the audio file, the attributes comprising information related to features and characteristics of the audio file and acoustic content of the audio file; generating, by the computing device, a query based on the determined attributes of the audio file; executing, by the computing device, in relation to at least one database associated with a platform provided by the computing device, a search based on the generated query; identifying, by the computing device, a set of audio files based on the search, the set of audio files comprising at least two different types of audio files, each audio file in the set of audio files comprising a context that corresponds to the determined attributes of the audio file; determining, by the computing device, a data structure for playback of the audio file and the set of audio files, the determination comprising: determining a sequence for the playback, the sequence corresponding to when one audio file begins playing respective to when another audio file is rendered; and determining a mixdown between adjacently positioned audio files within the determined sequence, the mixdown corresponding to an overlap in rendering of at least a portion of two adjacently positioned audio files; and facilitating, over the network, rendering of the playback.

In some embodiments, the analysis of the audio files that results in the determination of the attributes of the audio file is performed prior to the operations for generating the playback. In some embodiments, they are performed as audio files are identified. In some embodiments, they are performed in response to a request from a user, third party or partner. In some embodiments, prior analysis of like content (with or without knowledge of the parameters that drove the audio's creation) can provide an approximate set of attributes for that audio file.

In some embodiments, the sequence determination is based on a set of formulae (or formulas, used interchangeably), the formulae comprising information for ordering audio files at predetermined times or intervals.

In some embodiments, a mixdown comprises: analyzing each audio file associated with the playback; and determining, for each audio file in the playback, portions that are eligible for overlaying and portions that are ineligible for overlaying, wherein the mixdown determination is based on the determined portions.

In some embodiments, the method further comprises: receiving input parameters from a user, the input parameters corresponding to features and characteristics of the audio files included in the playback. In some embodiments, wherein the input parameters are utilized as part of the executed search. In some embodiments, the method further comprises: modifying the playback of at least one audio file based on the input parameters.

In some embodiments, the method further comprises: storing the playback data structure at a network location, wherein a user can access the playback audio files from the network location.

In some embodiments, the playback is a basis for a broadcast station made available over the network, wherein the audio files of the playback are streamed over the network.

In some embodiments, the at least one database is a multidimensional database that comprises a plurality of data structures for specific types of audio features and characteristics. In some embodiments, the generated query is formatted as an n-dimensional query for searching the multidimensional database.

In some embodiments, the at least one database comprises portions of audio files, the portions corresponding to features and characteristics of each audio file referenced in the at least one database.

In some embodiments, the playback comprises a set of audio files that comprise song content, and a set of audio files that comprise voice-over content. In some embodiments, the playback further comprises at least one audio file comprising third party content. In some embodiments, the playback further comprises at least one audio file comprising at least one of interstitial information, upsell information and back-sell information. As discussed herein, audio types can include, but are not limited to, songs, liners (e.g., voiceovers), interstitials, music beds, sound effects and content, and the like, or some combination thereof.

In some embodiments, the request comprises information describing the audio file, wherein the information describing the audio file corresponds to at least one of file type, name information, identifier and network location.

In some embodiments, the features and characteristics correspond to data related to, but not limited to, melodic features, tempo regions, amplitudes, beats per minute (BPM), fade ins/outs, features of individual stems (using source separation), dominant frequency ranges, structure, beat positions, onsets, harmonics, speakers/singer quantity, background noise, energy level, pitch, silence rates, duration, sonic genre classification (multiple classifications with or without weights), loudness, key, meter, gender of vocals (male or female), arrangement (music with vocal or instrumental), mood (happiness and sadness), character (acousticness and electronicness), danceability, harmony (tonal or atonal), attitude (aggressiveness and chillness), environmentalness (music or environmental sounds), and environmental sonic genre (multiple classifications with or without weights).

In some embodiments, a method is disclosed which includes the steps of: analyzing, by a computing device, an audio file, and determining attributes of the audio file, the attributes comprising information related to features of the audio file; determining, using the computing device, portions of the audio file that are eligible for overlaying and portions that are ineligible; generating, using the computing device, a mixdown between the audio file and a second audio file, the mixdown comprising ending the second audio file at a post; and providing, using the computing device, a rendering of the mixdown.

Some embodiments provide a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device (e.g., a server(s)) cause at least one processor to perform a method similar to the method discussed above, and detailed in the instant disclosure.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with some embodiments, program code (or program logic) executed by a processor(s) of a computing device to implement functionality in accordance with one or more such embodiments is embodied in, by and/or on a non-transitory computer-readable medium.

DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 7A-7B are diagrams illustrating non-limiting example embodiments of an audio file being processed according to some embodiments of the present disclosure;

FIG. 8 is a non-limiting example embodiment of an output file according to some embodiments of the present disclosure;

FIG. 11 is a flowchart detailing a non-limiting example embodiment according to some embodiments of the present disclosure;

FIG. 12 is a flowchart detailing a non-limiting example embodiment according to some embodiments of the present disclosure;

FIG. 13 is a flowchart illustrating a non-limiting example of the operations of the mixdown agent executed in some embodiments of the networked environment of FIGS. 6 and 10, according to some embodiments of the present disclosure;

FIGS. 14A-14E are diagrams illustrating non-limiting examples of two audio files that are processed by the mixdown agent according to some embodiments of the present disclosure;

DETAILED DESCRIPTION

Figure 1:
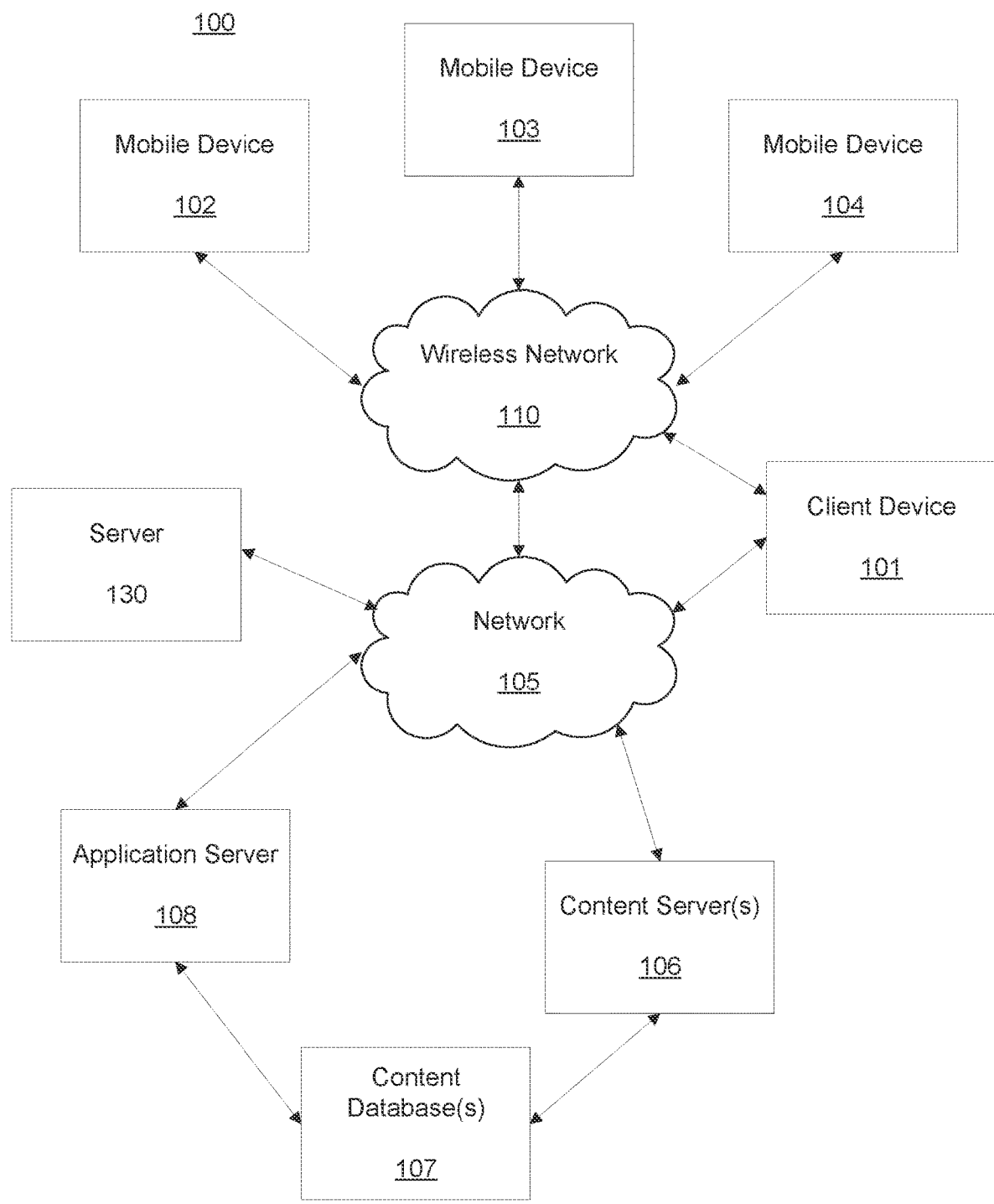
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, mobile edge computing (MEC), Bluetooth™, 802.11b/g/n, or the like. Network access technologies may enable wide area coverage for devices, such as client devices with varying degrees of mobility, for example.

In short, a wireless network may include any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and third-party server 130.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server or other appropriately configured computer.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

Third party server 130 can comprise a server that stores advertisements for presentation/rendering to users. "Ad serving" refers to methods used to stream online, audio advertisement files to users over a network, as users are streaming media content, and the like. Various monetization techniques or models may be used in connection with sponsored advertising, including advertising associated with user data. Such sponsored advertising includes, but is not limited to, monetization techniques including sponsored advertising, non-sponsored advertising, guaranteed and non-guaranteed delivery advertising, ad networks/exchanges, ad targeting, ad serving and ad analytics. Such systems can incorporate near instantaneous auctions of ad placement and insertion into media streams, (in some cases in less than 500 milliseconds) with higher quality audio ad placement opportunities resulting in higher revenues per ad. That is, advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

Another approach includes profile-type ad targeting. In this approach, user profiles specific to a user may be generated to model user behavior, for example, by tracking a user's path through a service, web site or network of sites, and compiling a profile based at least in part on pages or advertisements ultimately delivered. A correlation may be identified, such as for user purchases, for example. An identified correlation may be used to target potential purchasers by targeting content or advertisements to particular users. During providing of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data, media file programming information, and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

In some embodiments, servers 106, 108 and/or 130 can be embodied as a cloud server or configured for hosting cloud services, as discussed herein.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Additionally, while the illustrated embodiment in FIG. 1 depicts only servers 106, 108 and 130, it should not be construed as limiting, as any type and number of servers can be included therein. Further, while content database 107 is depicted as a single database, it should not be construed as limiting, as any type and number of databases can be included therein, as discussed in more detail below.

Figure 2:
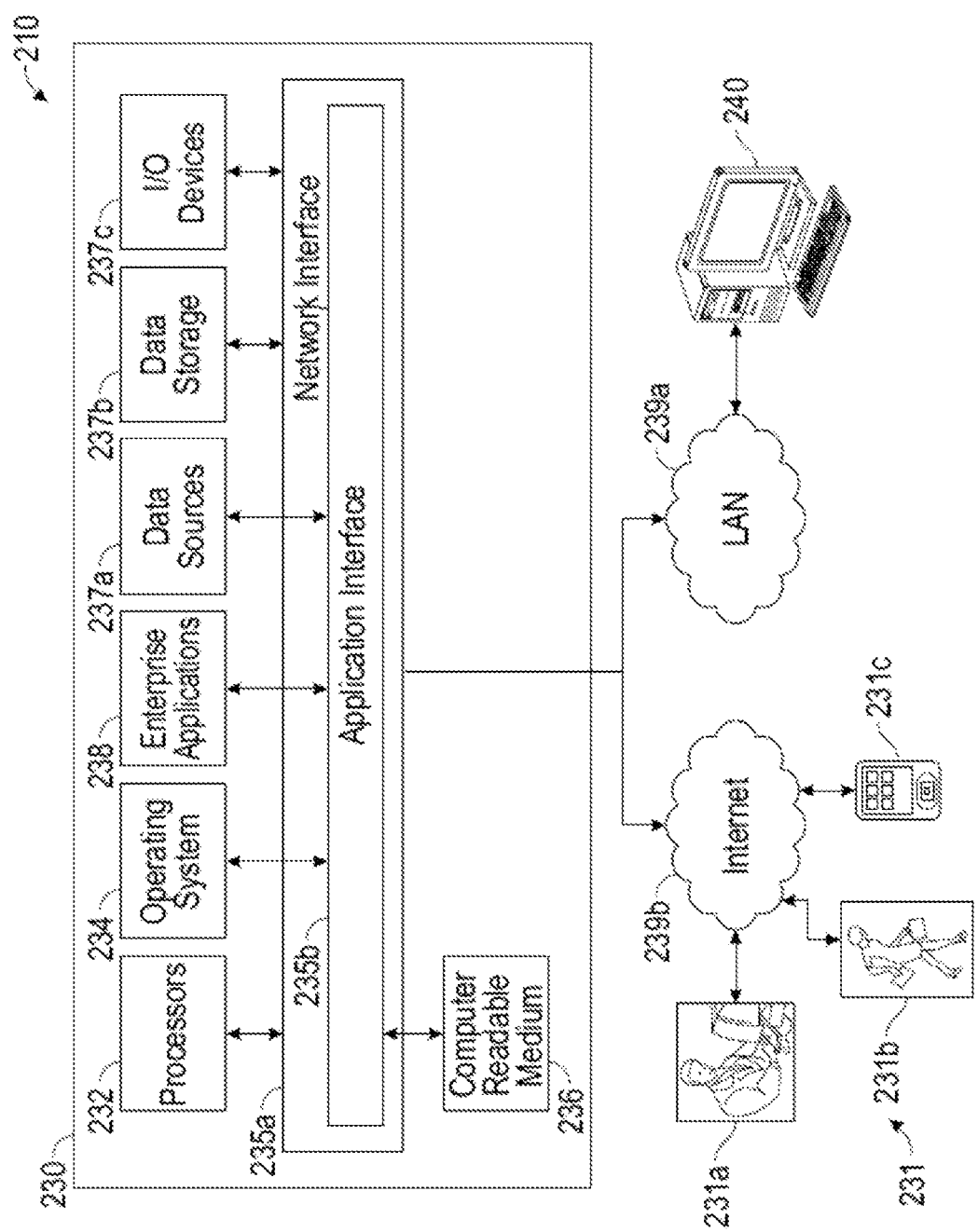
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating an embodiment of system 100 of FIG. 1, as discussed below. In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software and can operate to host at least one user account and/or at least one client account and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237a, and/or at least one data storage device 237b, and/or at least one input/output device 237c. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some embodiments, the user 231 can comprise a mobile user 231b coupled to the system 210. In some embodiments, the user 231b can use any mobile computing device 231c to wirelessly coupled to the system 210, including, but not limited to, personal digital assistants, and/or cellular phones, mobile phones, or smart phones, and/or pagers, and/or digital tablets, and/or fixed or mobile internet appliances.

Figure 3:
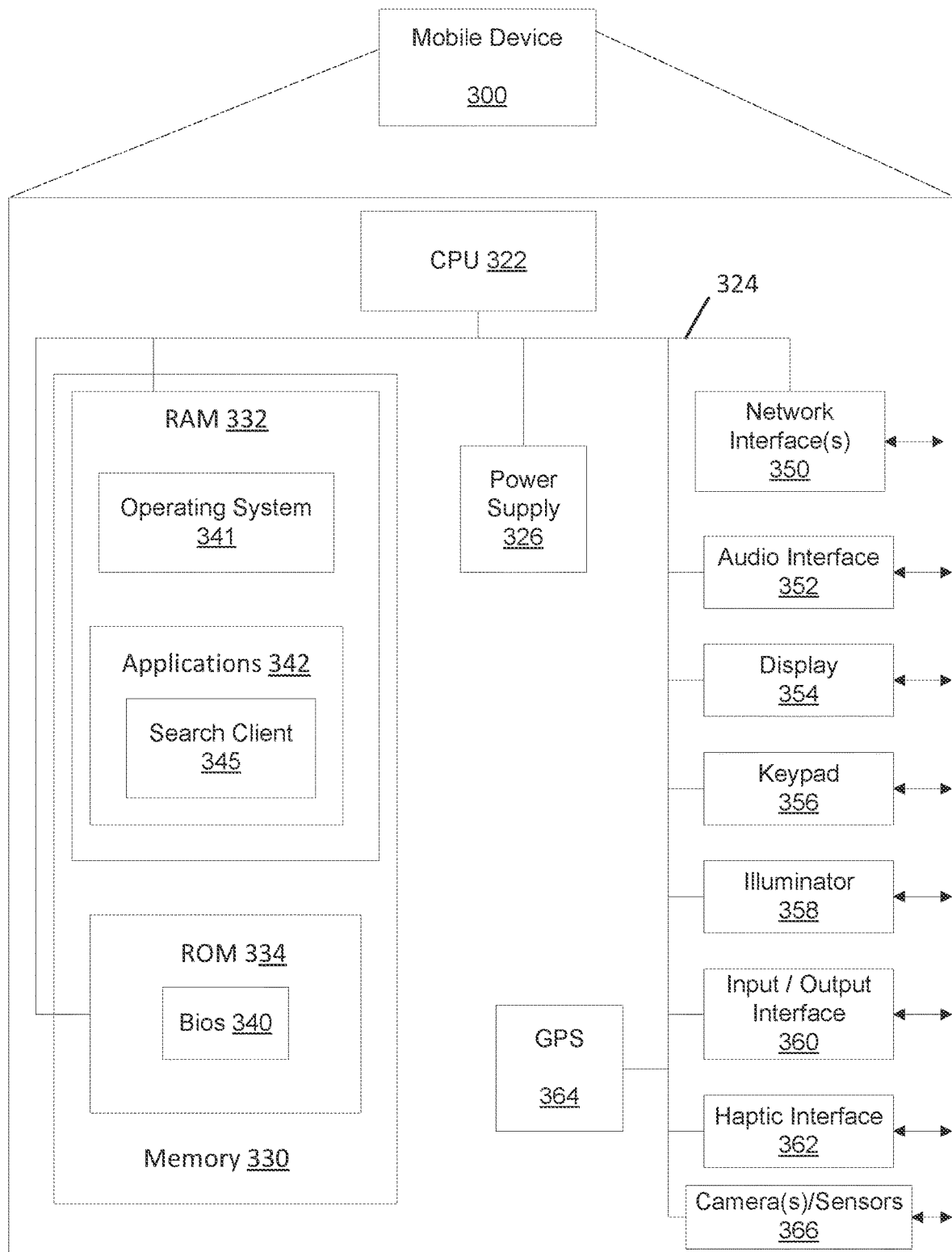
FIG. 3 depicts is a schematic diagram illustrating an example of client device according to some embodiments of the present disclosure.

FIG. 3 is a schematic diagram illustrating a client device showing an example embodiment of a client device that may be used within the present disclosure. Client device 300 may include many more or fewer components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, client device 300 includes a processing unit (CPU) 322 in communication with a mass memory 330 via a bus 324. In some embodiments, client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera(s) or other optical, thermal or electromagnetic sensors 366. Device 300 can include one camera/sensor 366, or a plurality of cameras/sensors 366, as understood by those of skill in the art. Power supply 326 provides power to the client device 300.

Client device 300 may optionally communicate with a conventional base station (not shown), or directly with another computing device. Network interface 350 is sometimes known as a transceiver, transceiving device, or network interface card (NIC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, NFC, infrared, Bluetooth™, or the like. In some embodiments, haptic interface 362 is arranged to provide tactile feedback to a user of the client device.

Optional GPS transceiver 364 can determine the physical coordinates of client device 300 on the surface of the Earth, which typically outputs a location as latitude and longitude values. GPS transceiver 364 can also employ other geo-positioning mechanisms, including, but not limited to, tri-angulation, assisted GPS (AGPS), E-OTD, CI, SAI, ETA, BSS or the like, to further determine the physical location of Client device 300 on the surface of the Earth. In some embodiments, however, the client device 300 may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of client device 300. The mass memory also stores an operating system 341 for controlling the operation of client device 300.

In some embodiments, memory 330 further includes one or more data stores, which can be utilized by client device 300 to store, among other things, applications 342 and/or other information or data. For example, data stores may be employed to store information that describes various capabilities of client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within client device 300.

In some embodiments, applications 342 may include computer executable instructions which, when executed by client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

Figure 4:
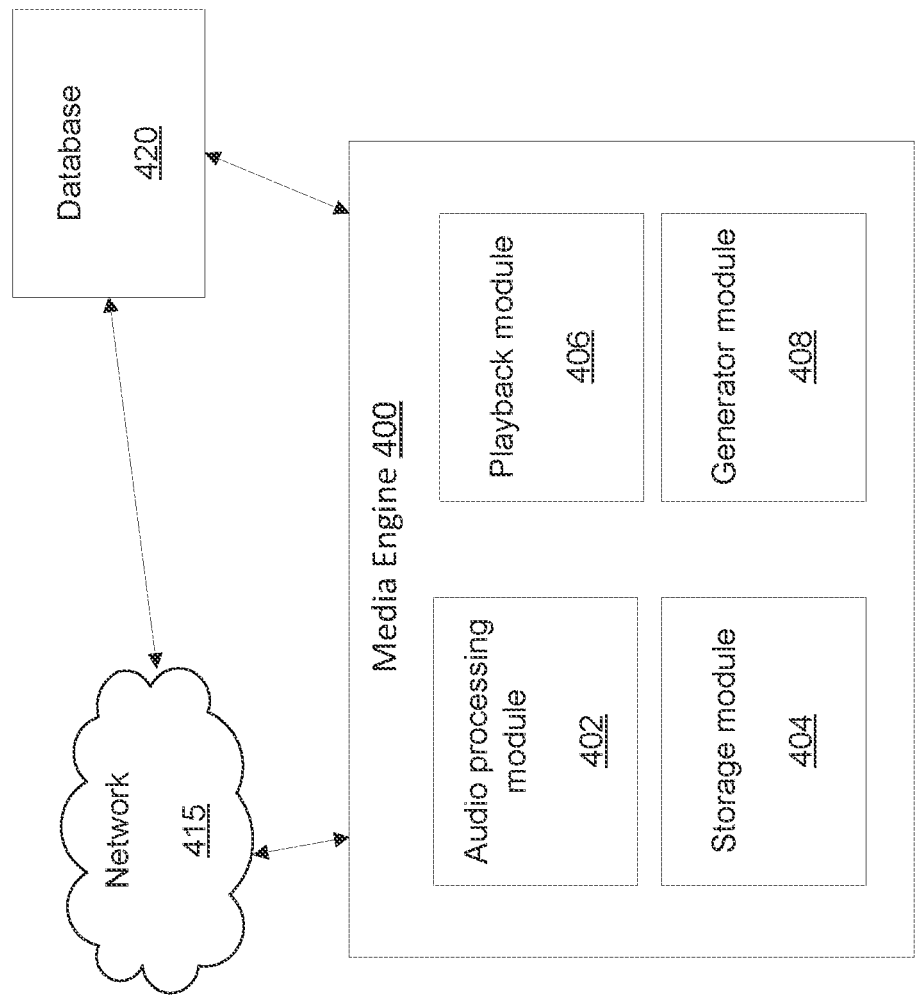
FIG. 4 is a block diagram illustrating components of an exemplary system according to some embodiments of the present disclosure.

FIG. 4 is a block diagram illustrating the components of some embodiments. FIG. 4 includes media engine 400, network 415 and database 420. The media engine 400 can be a special purpose machine or processor and could be hosted by a cloud server (e.g., cloud web services server(s)), application server, content server, web server, search server, content provider, third party server, user's computing device, and the like, or any combination thereof.

According to some embodiments, media engine 400 can be embodied as a stand-alone application that executes on a server and/or user device (e.g., on a cloud server and/or on-prem on a user device or local storage). In some embodiments, the media engine 400 can function as an application installed on a device. In some embodiments, such application can be a web-based application accessed by a device over a network. In some embodiments, the application can be a software development kit (SDK) or an application program interface (API), and the like.

The database 420 can be any type of database or memory and can be associated with a content server on a network (e.g., cloud server, content server, a search server or application server) or a user's device (e.g., client devices discussed above in FIGS. 1-3). Similarly to database 107 of FIG. 1, database 420 can be any type and number of databases, as discussed in more detail below.

Database 420 comprises a dataset of data and metadata associated with local and/or network information related to users, services, applications, content and the like. Such information can be stored and indexed in the database 420 independently and/or as a linked or associated dataset. As discussed above and in more detail below, it should be understood that the data (and metadata) in the database 420 can be any type of information and type, whether known or to be known, without departing from the scope of the present disclosure.

In some embodiments, database 420 can be configured as a multidimensional database that houses separate structures for handling different types of content files, content portions, and content portion configurations (e.g., feature vector data versus content data versus key-values, versus tags and tokens, and the like). It should be understood by those of skill in the art that any type of known or to be known type, format or version of multidimensional databases and/or vector similarity search engines (e.g., Annoy or Faiss) can be utilized without departing from the scope of the instant disclosure.

According to some embodiments, database 420 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

In some embodiments, the user data can also include, for purposes providing, displaying, creating, streaming, recommending, rendering and/or delivering media, user device information, including, but not limited to, device identifying information, device capability information, device display attributes (e.g., screen size, resolution, version, and the like), voice/data carrier information, Internet Protocol (IP) address, applications installed or capable of being installed or executed on such device, and/or any, or some combination thereof.

It should be understood that the data (and metadata) in the database 420 can be any type of information related to a user, content, a device, an application, a service provider, a content provider, whether known or to be known, without departing from the scope of the present disclosure.

According to some embodiments, database 420 can store data and metadata associated with media content from an assortment of media and/or service providers and/or platforms. For example, the information can be related to, but not limited to, content type of the media file, a category associated with the media, information associated with the audio quality and attributes (for example), information associated with the provider or hosting entity of the media, and any other type of known or to be known attribute or feature associated with a media file. Additionally, the media information in database 420 for each media file can comprise, but is not limited to, attributes including, but not limited to, popularity of the media, quality of the media, recency of the media (when it was published, shared, edited and the like), and the like. Such factors can be derived from information provided by the user, a service provider, by the content/service providers providing media content, or by other third party services (e.g., Facebook®, Twitter® and the like), or some combination thereof.

According to some embodiments, database 420 can store data and metadata associated with media files, including, but not limited to, audio files, video files, text files, multi-media files, and the like, or some combination thereof. The data/metadata can further include, but is not limited to, information related to users, products, applications, services, media providers, service providers, and the like, or some combination thereof. It should be understood that the data (and metadata) in the database 420 can be any type of information related to a user, media file, an application, a service provider, a content provider, whether known or to be known, without departing from the scope of the present disclosure.

While the focus on this disclosure will refer to audio files, it should not be construed as limiting, as any other type of media file, whether known or to be known, can be implemented without departing from the scope of the instant application. For example, audio files, as discussed herein, can be music files (e.g., songs), voice-overs (e.g., short clips of commentary), advertisements (e.g., 30 second audio ads from third parties), instrumentals (e.g., music beds), sound effects, and the like.

According to some embodiments, the media data/metadata can be stored in database 420 as an n-dimensional vector (or feature vector) representation for each media, where the information associated with the media can be translated as a node on the n-dimensional vector. Database 420 can store and index media information in database 420 as linked set of media data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. While the storage discussion herein focuses on vector analysis, the stored information in database 420 can be analyzed, stored and indexed according to any known or to be known computational analysis technique or algorithm, such as, but not limited to, cluster analysis, data mining, vector search engines, Bayesian network analysis, Hidden Markov models, artificial neural network analysis (ANN), convolutional neural networks (CNN), recurrent neural networks (RNNs), logical model and/or tree analysis, and the like. Additionally, the user data stored in database 420 can be stored in a similar manner.

As discussed above, with reference to FIGS. 1-2, the network 415 can be any type of network such as, but not limited to, a wireless network, a local area network (LAN), wide area network (WAN), the Internet, or a combination thereof. The network 415 facilitates connectivity of the media engine 400, and the database of stored resources 420. Indeed, as illustrated in FIG. 4, the media engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as media engine 400, and includes audio processing module 402, storage module 404, playback module 406 and generator module 408. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 5:
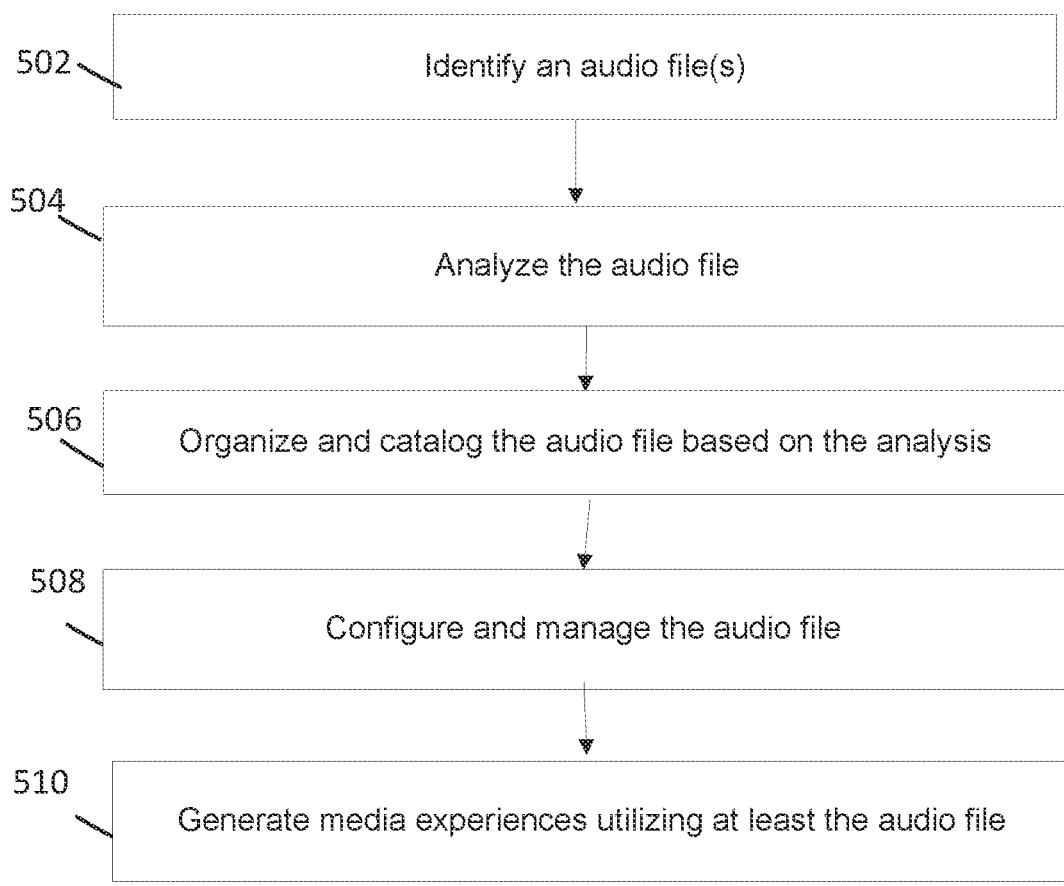
FIG. 5 is a flowchart detailing a non-limiting example embodiment according to some embodiments of the present disclosure.

Turning to FIG. 5, Process 500 provides non-limiting example embodiments for processing a media file in order for generation of an output experience (e.g., storage into a folder, a playlist, radio station, and the like, as discussed below). According to some embodiments, Steps 502-504 of Process 500 are performed by audio processing module 402 of media engine 400; Step 506 is performed by storage module 404; Step 508 is performed by playback module 406; and Step 510 is performed by generator module 408.

As mentioned above, for purposes of this disclosure, the media file being processed will be discussed in relation to an audio file, however, it should not be construed as limiting, as any type of media file format, whether known or to be known, can be utilized, analyzed and processed according to the disclosed system and methods discussed herein without departing from the scope of the instant disclosure.

Process 500 begins with Step 502 where an audio file is identified. In some embodiments, a set or plurality of audio files can be identified; however, for purposes of discussion in relation to Process 500, a single audio file will be discussed as being identified for clarification of operation purposes, as one of ordinary skill in the art would readily recognize that any number of audio files can be processed accordingly, either sequentially or as part of a batch operation.

In some embodiments, the audio file can be a licensed audio file, a user generated content (UGC) file, a network located audio file, and the like. In some embodiments, Step 502 can involve requesting an audio file from a third-party provider, where it can be retrieved and/or provided accordingly. In some embodiments, Step 502 can involve downloading the file from a network location (e.g., hosted to a file transfer (FTP) site, from where it is retrieved). In some embodiments, Step 502 can involve retrieving the file from an associated database (e.g., a local or network accessible datastore from which a collection of audio files is maintained).

In some embodiments, the audio file has associated therewith information indicating, but not limited to, a type of audio file (e.g., music, voice over, and the like), and an audio identifier (ID) (which can be an internal ID or an ID associated with the provider of the file). In some embodiments, this information can further indicate a source of the audio file, length, size, descriptive tags, relationships to other content, relationships to organizing entities (e.g., the voice, artist, album, record label, advertiser, content channel, and the like), associated visual images, and the like or some combination thereof. This information can be leveraged to store and provide the audio, as discussed in more detail below.

In Step 504, the audio file is analyzed. According to some embodiments, the analysis of the audio file results in the determination, detection, retrieval, extraction or otherwise identification of attributes, characteristics, features, deep descriptors, and the like, or some combination thereof, of the audio file.

In some embodiments, the analysis performed in Step 504 of the audio file from Step 502 can involve analysis and identification of data/metadata by any known or to be known audio (or media) file analysis technique, algorithm, classifier or mechanism, including, but not limited to, ANNs, CNNs, RNNs, generative adversarial networks (GANNs), source separation with recursive stem analysis, audio segmentation and labeling, predominant melody extraction, harmonic chord progression extraction, onset detection, beat detection, downbeat detection, rubato detection, neural BPM identification (which leverages multiple DSP, RNN, and CNN techniques), amplitude analysis and directional profiling, computer vision, Bayesian network analysis, Hidden Markov Models, data mining, feature vector analysis, logical model and/or tree analysis, and the like.

In some embodiments, such analysis, as discussed herein, and when discussed below in relation to similar analysis, identification and determination steps, can involve using any known or to be known deep learning architecture or algorithm, such as, but not limited to, deep neural networks, ANNs, CNNs, deep belief networks and the like.

According to some embodiments, engine 400 employs CNNs (however, it should not be construed to limit the present disclosure to only the usage of CNNs, as any known or to be known deep learning architecture or algorithm is applicable to the disclosed systems and methods discussed herein). CNNs, as discussed herein, can operate on a CPU or on an associated graphics processing unit (GPU) for enhanced performance. CNNs consist of multiple layers which can include: the convolutional layer, ReLU (rectified linear unit) layer, pooling layer, dropout layer and loss layer, as understood by those of skill in the art. When used for audio recognition, CNNs produce multiple tiers of deep feature collections by analyzing small portions of an input audio file, which enables the identification and viewing of portions and/or an entirety of an audio file, as well as its changes over time.

For purposes of this disclosure, such features/descriptors can include, but are not limited to, audio characteristics of the audio files (or "slices" or portions of the file) characterized (or categorized and labeled) by acoustic features, melodic features, type features, harmonic features, rhythm features, and the like, or some combination thereof. The results of these collections are then tiled so that they overlap to obtain a better representation of the original audio; which is repeated for every CNN layer. CNNs may include local or global pooling layers, which combine the outputs of feature clusters. One advantage of CNNs is the use of shared weight in convolutional layers; that is, the same filter (weights) is used for each audio portion in each layer, thereby reducing required memory size and improving performance. Compared to other classification algorithms, CNNs use relatively little pre-processing which avoids the dependence on prior-knowledge and the existence of difficult to design hand-crafted features.

According to some embodiments, engine 400 can perform the analysis of Step 504 and determine i) dominance drive values; ii) confidence driven values and/or iii) matrix values. These values can be compared against a threshold to ensure a minimum amount of dominance, confidence and/or "order" (from the matrix values) are provided or observed.

In some embodiments, dominance driven values represent the dominant feature from a pool of two or more features. The pool can be for an audio file, or a set of audio files. Two features are usually represented by a floating point number that orients the observation between the two features (e.g., tonalness). Three or more features are represented by an integer and a companion confidence measure (e.g., genre).

In some embodiments, confidence driven values represent how confidently the feature was observed. This is not to be confused with a bipolar measure; the low-confidence observation does not necessarily represent the corollary of the feature. For example, low happiness does not mean sadness was detected. In order to evaluate how sad the content is, engine 400 may need to use a sadness measure. In some embodiments, these features are identified independently and may, in some cases, conflict with each other.

In some embodiments, matrix values are an ordered array of values that consist of an ID and a confidence value. In some embodiments, matrix values can primarily be used to convey the complex output of a multi-value analysis model (e.g., Music Genre).

In some embodiments, engine 400 can be configured to determine the actual feature value using the feature-appropriate units (e.g., time of a beat in fractional seconds, pitch of a melody at a specific moment using hertz, amplitude in decibels, and the like).

According to some embodiments, FIGS. 6-10 provide disclosure of non-limiting example embodiments of Step 504's analysis for processing an audio file. In some embodiments, FIGS. 6-10 provide embodiments for processing an audio file to determine one or more overlays or other effects that are suitable for overlaying with other audio content (e.g., voiceover, audio identifiers, sound effects, sonic branding, and the like, for example). Some embodiments use artificial intelligence (AI) and/or digital signal processing to identify regions of a song or other file that are appropriate for overlay of other content (voiceover, sound effects, music, and the like) and extracting features (time markers, and the like) that help guide the overlay (e.g., CNNs as discussed above). Some embodiments include substantially or exactly "hitting the post" using overlaid content, as discussed below, where "posts" correspond to significant moments in a particular song (or type of audio), for example, which should be allowed to be rendered in an interrupted or unmodified manner (e.g., the guitar solo in "Free Bird" by Lynyrd Skynyrd). In some embodiments, portions of audio files that are identified as "posts" are tagged, whereby modification of the audio file and/or modification of its playback is restricted.

By way of background, digital and terrestrial radio stations play music to listeners. Audio is typically inserted in between or dubbed over portions of the music. For example, disc jockeys (DJs) may speak over the beginning portion of the song or may play a prerecording of audio content that overlaps with a portion of a song. In some domains, DJs, fitness instructors, or other persons may overlay their voices over significant portions of songs. In terrestrial radio, determining where it is safe to perform an overlay at the front of a song is done by a human who "tags" a particular song with one or more time markers that indicate "posts" or other "sonically significant"—for example, moments where a DJ should stop talking. Some songs may be unsuitable for voiceover or other overlays in their entirety (e.g., radio edits that remove portions of original files from where availability to overlay content is removed or filtered out). These human-performed analyses can be complex, time-consuming and subjective, leading to inaccurate or less desirable experiences and outcomes.

As discussed herein in relation to at least FIGS. 6-10, the disclosed framework addresses these technical shortcomings by providing systems and methods for identifying regions of audio files (or songs, used interchangeably) that are considered "safe" for overlay of different types of content (e.g., with the human voice being the primary one in some embodiments) and then, within those regions, the moments to which the audio is aligned will sound better—more musical or artful.

According to some embodiments, such overlay regions can be identified in an audio file. In some embodiments, the overlay regions can be identified in a video as well, where audio is being provided as a background, for example. However, for purposes of this disclosure, an audio file will be discussed; however, it should not be construed as limiting, as one of skill in the art would recognize how the disclosed subject matter can be applied to different media file types.

For example, an audio file can represent a song. Some embodiments identify a musical moment where the song's melody, beat, vocals or instrumentals, and the like, become prominent or where they become significantly less prominent. In some embodiments, the segmentation and downbeat analysis can be leveraged to identify an exact moment(s) for the most "natural" entrance and exits of overlay material, as discussed supra. Between these musical moments, in some embodiments, the audio processor identifies candidate sections that are deemed appropriate for overlaying additional audio content. The audio content may be pre-recorded, taken from a live source or "rendered" (either prior or in real-time) using text to speech or other suitable techniques.

Figure 6:
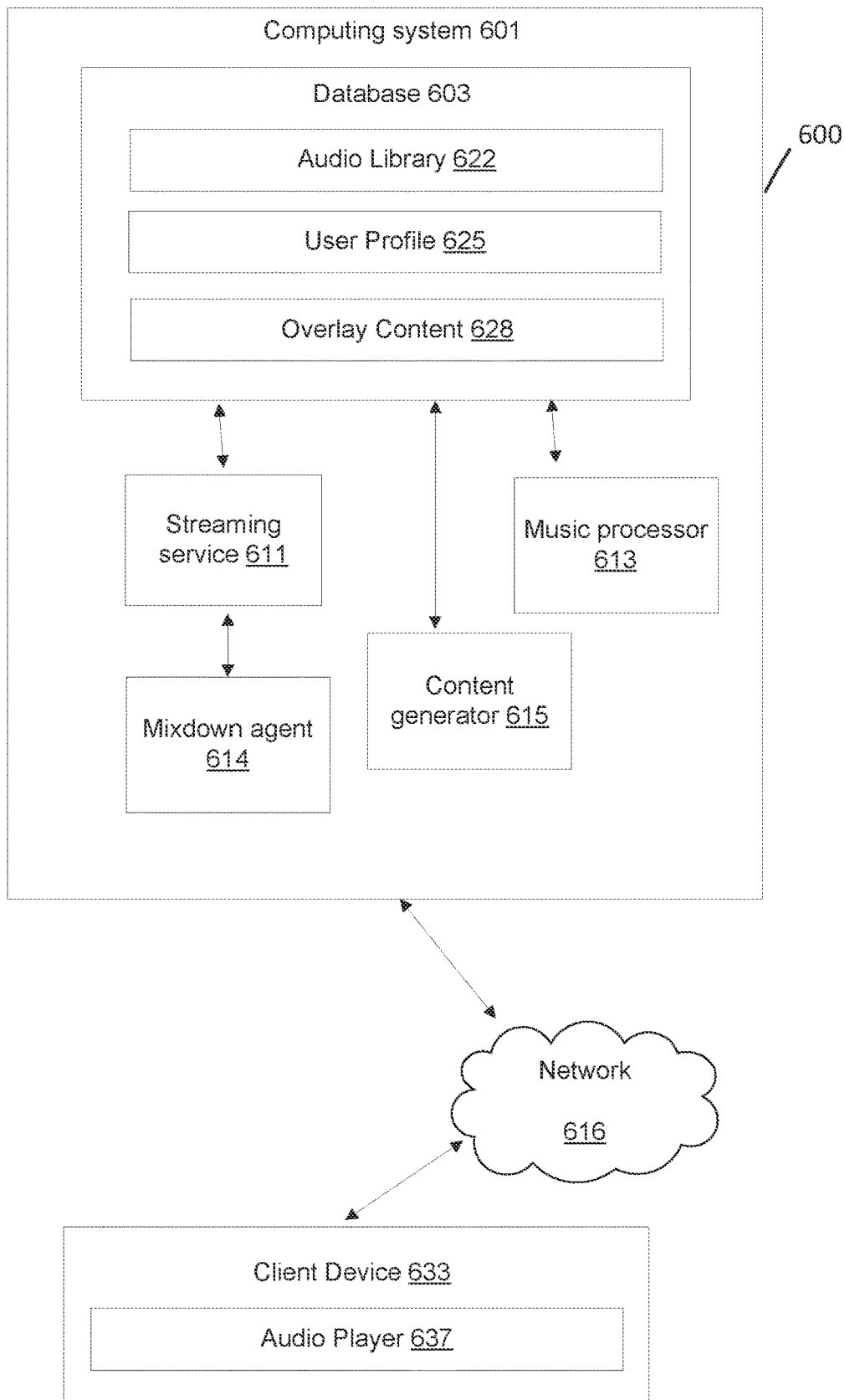
FIG. 6 is a non-limiting example diagrammatic view of a networked environment for processing audio files according to some embodiments of the present disclosure.

FIG. 6 depicts a networked environment 600 according to some embodiments. The networked environment 600 includes a computing system 601 that is made up of a combination of hardware and software, as discussed above in relation to FIGS. 1-3.

The computing system 601 includes a database 603, a streaming service 611 and an audio (or music, used interchangeably) processor 613. In some embodiments, as discussed in detail below, system 601 can further or alternatively include, mixdown agent 614 and content generator 615 (the functionality of which are discussed in more detail below in relation to FIGS. 13-18). The computing system 601 may be connected to a network 616 such as the Internet, intranets, extranets, wide area networks (WANs), local area networks (LANs), wired networks, wireless networks, or other suitable networks, and the like, or some combination thereof (as discussed above in relation to at least FIG. 1).

The computing system 601 may comprise, for example, a server computer or any other system providing computing capability. Alternatively, the computing system 601 may employ a plurality of computing devices that may be arranged, for example, in one or more server banks or computer banks or other arrangements. Such computing devices may be located in a single installation or may be distributed among many different geographical locations. For example, the computing system 601 may include a plurality of computing devices that together may comprise a hosted computing resource, a grid computing resource and/or any other distributed computing arrangement. In some cases, the computing system 601 may correspond to an elastic computing resource where the allotted capacity of processing, network, storage, or other computing-related resources may vary over time. The computing system 601 may implement one or more virtual machines that use the resources of the computing system 601.

Various applications and/or other functionality may be executed in the computing system 601 according to various embodiments. Also, various data is stored in the database 603 or other memory that is accessible to the computing system 601. The database 603 may represent one or more databases 603.

The streaming service 611 and audio processor 613 mentioned above are components executed on the computing system 601. These components may generate data and store the data on the database 603 and/or access the contents of the database 603. The streaming service 611 may be an application implemented on one or more webservers that enable users to subscribe, create, edit, and manage stream audio (e.g., digital radio stations). The streaming service 611 receives user input and generates an encoded audio stream that is transmitted over the network 616 for playback.

The audio processor 613 may comprise a software application or module that may communicate with the streaming service 611. The audio processor 613 may employ one or more APIs or other interfaces to plug into the streaming service 611, receive control commands and data from the streaming service 611 and generate output data that is transmitted to the streaming service 611.

In some embodiments, the data stored in the database 603 includes an audio library 622, user profiles 625, and overlay content. The audio library 622 may comprise audio files. As discussed below, the audio library may include portions or segments for storing components, slices or other portions of an audio file (e.g., a primary library and a secondary library).

According to embodiments of the instant disclosure, an audio file may be a song file, audio recording, or any other audio file. In some embodiments, the audio file may include any or all types of metadata such as artist, title, album information, chapter information, descriptive and relational tagging, and the like.

The user profiles 625 include data for various user accounts managed by the streaming service 611. User profiles can include similar information as discussed above in relation to database 420 in FIG. 4. A user account may include a user name, password, credentials, and other subscription information. The user profiles 625 may include the audio preferences of a user, such as, an identification of preferred songs, radio stations, and other experiential preferences. In some embodiments, the overlay content 628 may be a library of audio files containing branding and advertising content.

In some embodiments, the overlay content 628 may be a library of audio files containing retail branding and advertising content for in-store or other suitable environments. In some embodiments, each item making up the overlay content can correspond to metadata, such as, but not limited to, the duration of the item, size of the item, and the like.

The networked environment 600 also includes one or more client device(s) 633. A client device 633 allows a user to interact with the components of the computing system 601 over the network 616. A client device 633 (as discussed above in relation to at least FIGS. 1-3), may be, for example, a networked speaker, a cell phone, laptop, personal computer, mobile device, or any other computing device used by a user. The client device 633 may include an audio player 637 comprising an application such as a web browser or mobile application that communicates with the streaming service 616 to select and receive audio streams. The client device 637 may also comprise a radio receiver such as, for example, an AM/FM receiver for receiving terrestrial broadcasts.

Next, a general description of the operation of the various components of the networked environment 600 is provided in accordance with some embodiments. Through a client device 633, a user may subscribe to a streaming service 611 and specify a preference to an audio stream. The audio service 611 selects various audio files from the audio library 622 and assembles them in serial order into an audio stream that is then transmitted over the network 616 to a client device 633. The streaming service 611 may dynamically create a playlist of audio files to be streamed in a particular order. The playlist may include the currently streamed audio file, the subsequently streamed audio file, and potentially additional audio files to be streamed in order. As the streaming service 611 moves down the playlist, it prepares the audio files to be transmitted into a digital stream.

In some embodiments, the audio player 637 of a client device 633 receives the audio stream, decodes it, and plays it back through one or more speakers in communication with the client device 633. The user may provide input to the streaming service 611, which can include such actions as, but not limited to, skipping to the next track, pausing, changing stations, providing feedback regarding an interest (e.g., "like" or "dislike"), and in some embodiments, as discussed below, can provide parameters to alter the output (e.g., change volume, energy level, speed of playback, aggressiveness of overlaying, factors relating to the personality or overall perception of the output, and the like). In response, according to the disclosed functionality, the streaming service 611 may access the audio library 622 to create an updated audio stream in response to the user input. In some embodiments, some or all of the parameters are adjusted solely by the streaming service or its vendors to provide a desired user listening experience.

Some embodiments of the present disclosure are directed to an audio processor 613 that fundamentally enhances the functionality provided by a conventional streaming service. The audio processor 613 processes the audio files to generate an output file. The output file may then be transmitted to the streaming service 611, whether it is then transmitted to the client device 613 or it may be transmitted to the client device 613 directly. The following provides detailed examples of the functionality of the audio processor 613. Embodiments of the audio processor 613 are described in greater detail below with respect to the remaining figures.

FIGS. 7A-7B are diagrams illustrating examples of an audio file being processed by the audio analyzer in the networked environment of FIG. 6, according to some embodiments of the present disclosure. FIG. 7A shows an embodiment of an audio file 700 that is processed by the audio processor. The audio file 700 includes a song that is composed with various musical components. The audio processor 613 receives the audio file 700 and identifies musical moments (including, but not limited to, posts) and overlay-eligible regions in the audio file. A musical moment may be, for example, when a quiet introduction of a song ends and the primary melody begins, where the vocals of a song begin or end, where a primary instrument begins or ends, when a particular verse or chorus begins or ends, when the song winds down and an outro begins.

As discussed herein, the processor 613 can identify these portions (e.g., melody and/or pitch moments/portions) via a CNN or at least two CNNs, where each CNN is trained to focus on a specific portion, or satisfy a predetermined confidence rate of retrieval/detection. Thus, portions of a song where singing, for example, may be occurring can be avoided as being overlaid (or trimmed as part of a radio edit, as discussed below). For example, when processor 613 determines that a portion of an audio file (using an extracted vocal stem) has an amplitude above a threshold level, then this can be an indication that singing is occurring, and this portion (e.g., buffered by a predetermined number of bits, in some embodiments), can be tagged as a post to avoid during a mixdown.

Some embodiments can be used for a single file alone and for multiple files that are being played in sequence (and transitioned between them). Some embodiments include additional logic where, for example, file A and B are overlain and then a determination is made to add voiceover content C over the period of the overlap. In some embodiments, the attributes of A and B are evaluated during the overlap period to have a deeper understanding of the eligibility and timing of the C element and the behavior of the externally or internally generated transition may be altered by this new end state. In some embodiments, after identifying the musical moments and/or overlay-eligible portions, the audio processor segments the audio file into one or more candidate sections 705 and one or more restricted sections 708. In some embodiments, the sections 705, 708 are defined by the transitions serving as the boundary between segments. A candidate or overlay-eligible section can be marked with confidence scores or levels 705 and can be a portion of the song where it is deemed acceptable to overlay the song with overlay content 628. A restricted or overlay-ineligible section 708 is a portion of the song where it is deemed unacceptable to overlay the song with overlay content 628. These acceptability and unacceptability determinations can be performed in a wide variety of manners, but algorithmic determinations are used in some embodiments.

According to some embodiments, the musical moments and/or portions of the file may be classified as overlay eligible or overlay ineligible. In some embodiments, an overlay ineligible portion corresponds to a "hard post"— with no talking or other voiceovers or overlays being allowed past this point at the front of the song. In some embodiments, "soft posts" are musical timestamps within the overlay eligible or "safe" regions that are "alignment opportunities" with the effect of the voiceover (or other audio element) being more artfully integrated in with the music. In some embodiments, the soft posts represent things like musical instrument entries and/or exits or structural changes in the composition itself.

The audio processor 613 may be configured in various ways to identify candidate sections 705 and restricted sections. In some embodiments, audio processor 613 may receive audio files that are manually tagged to indicate the position of the transitions or character of the content (e.g., "has voice" versus "instrumental"). The audio processor 613 may comprise a classifier that is trained according to the manually tagged audio files to classify additional audio files. In this respect, the classifier is trained using training data to generate overlays for new audio files based on tagged samples. For example, the audio processor 613 may divide a waveform into segments and then classify those segments using a binary or ordinal classifier.

The audio processor 613 may implement artificial intelligence algorithms to analyze the waveform of the audio file to identify overlay eligible ("safe") and overlay ineligible ("unsafe") portions (with or without an associated confidence score for each region). For example, the audio processor 613 may locate the time positions in the waveform where the amplitude suddenly increases and is sustained for a predetermined amount of time. The audio processor 613 may also or instead locate the time positions where the waveform transitions from periodic to more irregular.

According to some embodiments, the identification of eligible and/or ineligible portions can involve, but is not limited to, determining a confidence value for these portions (as mentioned above); and when the confidence value is at or above a threshold value, then they can be marked accordingly.

In some embodiments, the manually tagged audio files may be used to supplement or override the overlay regions identified by employing the algorithms discussed above (using explicitly tagged audio regions or a list of one or more timestamps that are used for synchronizing the display of lyrics). For example, AI algorithms and machine learning algorithms (e.g., CNNs) might be insensitive to culturally significant sections of a song. Such culturally significant sections can include, for example, but are not limited to, song sections considered classics, or other desired criteria or attributes can be used that contribute to or detract from overlay suitability. For example, such sections can be a section that, but its features, is safe for overlay but would be culturally insensitive to do so (e.g., a quiet vocal at the end of a song, a special moment in a guitar solo during a fade-out, and the like). Therefore, pre-tagged songs may override the decision making process as a mechanism to create certain desirable exceptions for specific songs. In some embodiments, many factors can contribute to tagging confidence scores or levels, as discussed herein.

In some embodiments, candidate sections 705 may be identified as portions that can be "trimmed"—either removed (by modifying the audio file) or tagged as a portion to automatically skip when rendering from either the beginning or end of an audio file. That is, some songs have either beginning or end portions that can be removed without impacting the listening experience of the song. These are known as "radio edit" portions that DJs would either skip over (e.g., start a track at a point after the beginning of a song) or speak over (as it played in the background). Thus, in some embodiments, according to the mechanisms discussed herein, the audio file can be analyzed (e.g., via CNNs detection of a certain type of content and/or lack thereof (e.g., a portion that is inconsequential to the audio content), and these portions can be identified as an alternative embodiment of candidate sections 705, whereby engine 400 can remove or tag the portion so that a "radio edit" is achieved. This modified audio file can then be stored in a database, which can be performed according to the embodiments of storing audio information, as discussed below.

The audio processor 613 may also employ the capabilities of a digital signal processor (DSP) to identify candidate sections 705 and restricted sections 708. The DSP may be configured to determine overlay eligible and ineligible portions using melodic identification, identification of frequencies in the human vocal range, identification of significant instrumental sections, identification of human speech or singing, or a wide variety of other identification techniques (e.g., identification segmentation and downbeats, as discussed above) further detailed in patent applications incorporated by reference herein. Some embodiments use source-separation and then analysis of those files which may include extracting (e.g., using digital signal processing (DSP) and machine learning (ML), for example) the vocals from the track and then analyzing the timing and other characteristics of that isolated track.

Some embodiments can analyze files comprising "stems" (a multi-channel mix of the song where the system can enable only particular musical instruments or performers). The aforementioned DSP/ML can also be used to extract the stems in some embodiments.

FIG. 7B shows the selection of overlay content 628 based on the identified candidate sections 205. For one or more candidate sections 705, the audio processor 613 selects overlay content 628, such as an audio clip. According to some embodiments, the audio processor 613 selects the overlay content 628 by matching the duration of the overlay content to the duration of the candidate section 705. In some embodiments, characteristics of the candidate section that help to identify the appropriate overlay element can include, without limitation, duration, tempo, key, energy level, energy, instrumentation, structural position, and the like. In other embodiments, the overlay content may be a live audio stream or any other audio signal. In some embodiments, the overlay content can comprise branding content which can be well-integrated into the resulting content and output file. In some embodiments, content can be produced in a wide range of lengths and other variations, and the processor 613 can select the best fitting content for the particular application. Some embodiments can identify regions that are "safe with modification" which could include techniques like reducing the amplitude of the source material, removing vocals from the material, or even remixing the material in other ways.

FIG. 8 is a diagram illustrating an example of an output file in the networked environment of FIG. 6, according to various embodiments of the present disclosure. FIG. 8 shows a processed audio file 800 that is generated by inserting a mixed section 803 into the processed audio file 300. The mixed section is generated by mixing the overlay content 628 with the candidate section 705. There may be one or more instances of mixed sections 303 inserted into the processed audio file 800. In some embodiments, the insertions are naturalistic, artful and respectful of context and other factors. In some embodiments, the disclosed systems and methods utilize analysis of the audio sections that are to be overlain and analysis of the overlaying audio to match the two sections (e.g., by selecting a "low energy" voice read for a "low energy" section of music).

According to some embodiments, in fitness music applications, a clips of a fitness instructor's voice commands or instructions may be inserted into the process audio file 800 so that the audio file plays and includes interruption in only portions of a song that are deemed acceptable. Some embodiments provide a seamless and pleasing audio experience balancing the need to provide fitness instructions while preventing overlaying instructions over portions of the audio file which should not be overlain.

Figure 9:
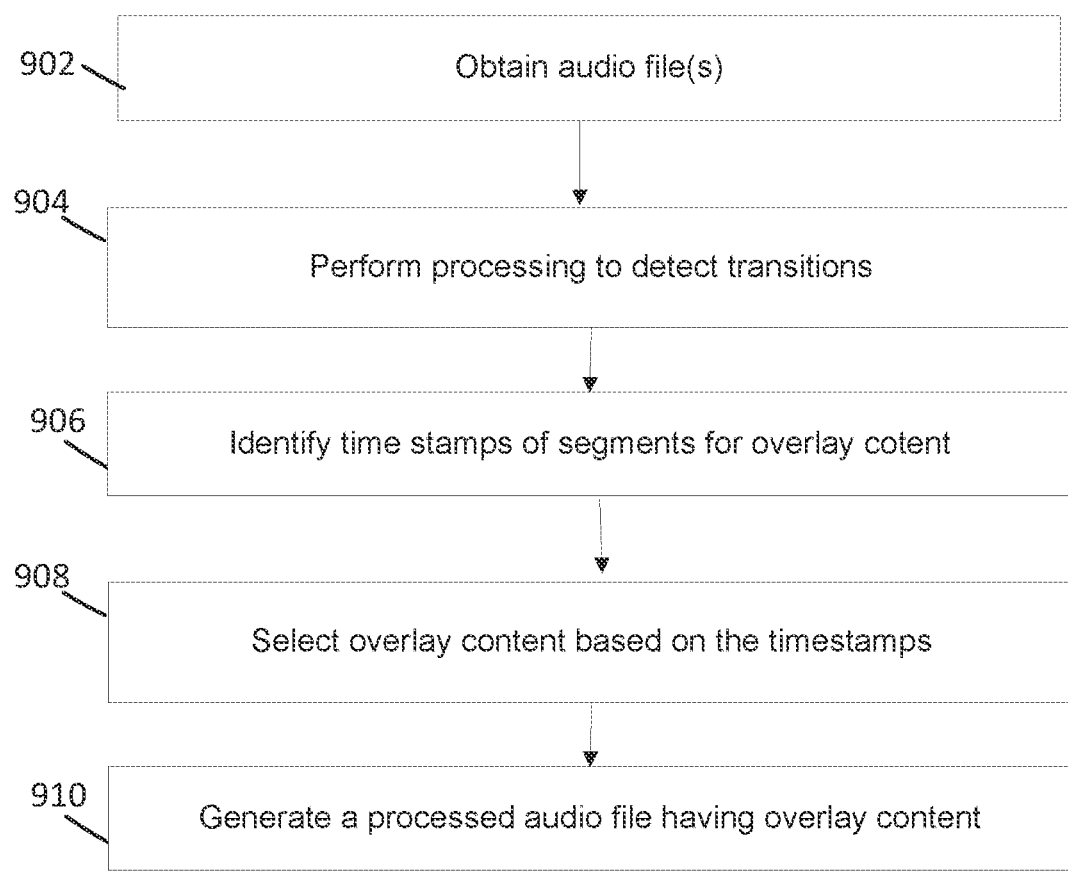
FIG. 9 is a flowchart illustrating a non-limiting example embodiment of operations for processing an audio file.

FIG. 9 is a flowchart illustrating an example of the operations of the audio processor 613 executed in the networked environment 600 of FIG. 6, according to various embodiments of the present disclosure. It is understood that the flowchart of FIG. 9 provides merely an example of the many different types of analyses and determinations of functional arrangements that may be employed to implement the operation of the audio processor 613 described herein (e.g., an embodiment of Step 504, as discussed herein).

In Step 902, the audio processor 613 obtains an audio file 300. The audio file 300 may be obtained from an audio library 622 or may be extracted from an audio stream or any other suitable source. For example, an audio file may be uploaded by service 611 to an FTP site, where process 613 retrieves it for processing.

In Step 904, the audio processor 613 performs processing to detect overlay eligible and overlay ineligible regions. As discussed above, the processing can involve analyzing the audio file using, for example, a CNN.

In Step 906, the audio processor 613 identifies, based on the processing of Step 904, time stamps of segments for overlay content 628. For example, the audio processor 613 identifies candidate sections 705 and restricted sections 708 in between the identified musical moments or regions. The audio processor 613 may generate a list of the timestamps for each section 705, 708.

In Step 908, the audio processor 613 selects overlay content 628 based on the timestamps in accordance with some embodiments. In some embodiments, the selection can be based on application of a CNN. The overlay content 628 might be selected as a targeted advertisement based on the listener or any other audio clip taken from a library, and the duration of the overlay content 628 is selected to match the duration of the candidate section 705. In some embodiments, the overlay content may be processed or created to be longer or shorter to match the duration of the candidate section 705. This may include, for example, time stretching/shrinking or clipping operations.

In Step 910, the audio processor generates a processed audio file 800 having the overlay content 628 in accordance with some embodiments. In some embodiments, the overlay content is mixed with a selected candidate section 705 to create a mixed section 803. The mixed section 803 replaces the candidate section 705 in some embodiments. Thus, the processed audio file 800 is the same as the original audio file 700 except that it includes overlay content 628 that is mixed into the audio file at a time range that improves the listening experience in some embodiments.

Figure 10:
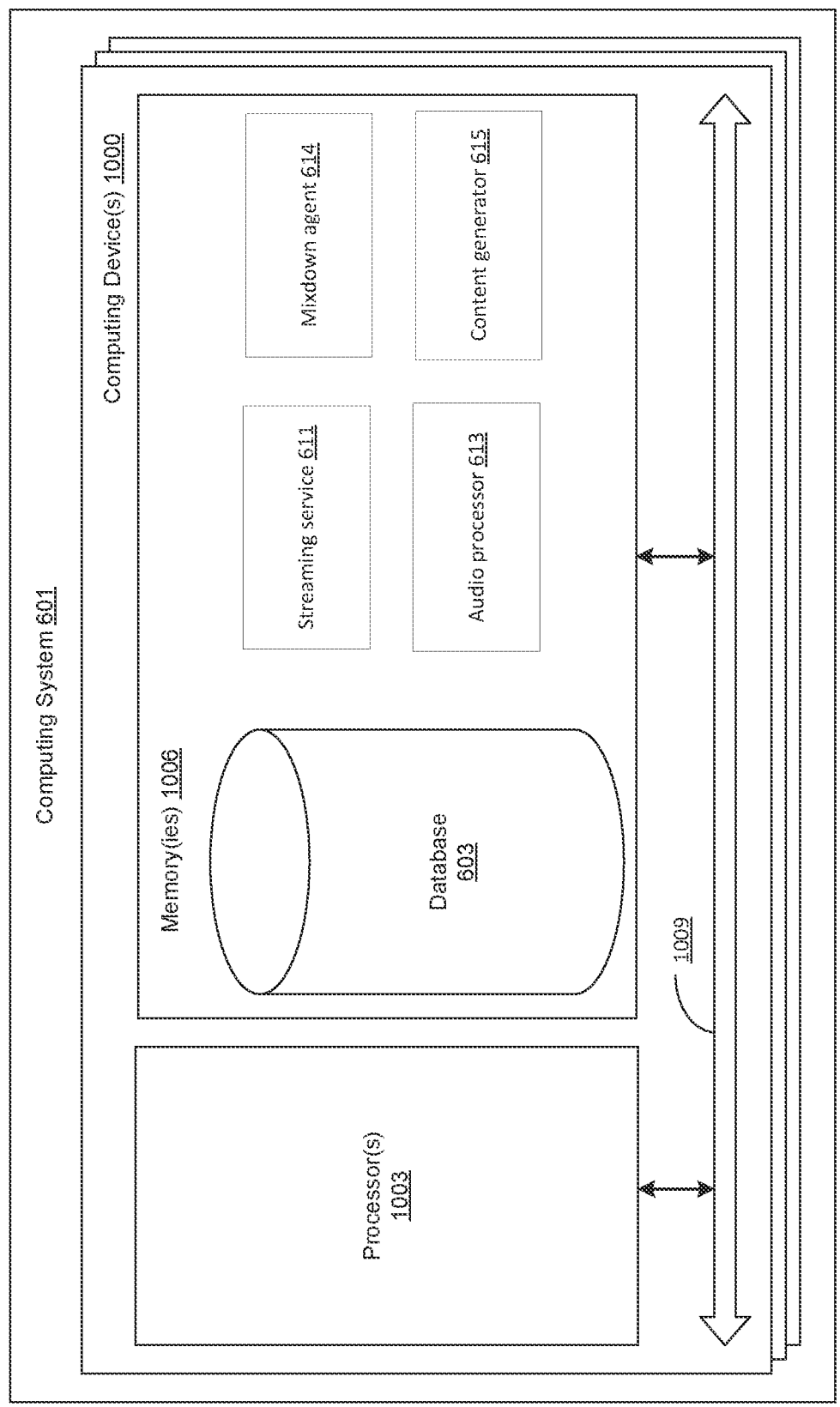
FIG. 10 is a schematic block diagram that provides a non-limiting example embodiment a computing device in the networked environment of FIG. 6 according to some embodiments of the present disclosure.

FIG. 10 is a schematic block diagram that provides one example illustration of a computing system 601 of FIG. 6 according to various embodiments of the present disclosure. The computing system 601 includes one or more computing devices 1000. Each computing device 1000 includes at least one processor circuit, for example, having a processor 1003 and memory 1006, both of which are coupled to a local interface 1009 or bus. To this end, each computing device 1000 may comprise, for example, at least one server computer or like device. The local interface 1009 may comprise, for example, a data bus with an accompanying address/control bus or other bus structure as is known in the art.

Stored in the memory 1006 are both data and several components that are executable by the processor 1003. In particular, stored in the memory 1006 and executable by the processor 1003 is the streaming service 611 and audio processor 613. Also stored in the memory 1006 may be a database 603 and other data such as, for example, audio library 622, user profile 625, and overlay content 628. In addition, an operating system may be stored in the memory 1006 and executable by the processor 1003.

In some embodiments, as discussed in detail below, system 601 can further or alternatively include, mixdown agent 614 and content generator 615.

Although the streaming service 611 and audio processor 613 (and mixdown agent 614 and content generator 615) described herein may be embodied in software or code executed as discussed above, as an alternative the same may also be embodied in dedicated hardware or a combination of software/hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, and the like. Such technologies are generally well known by those skilled in the art and, consequently, are not described in detail herein.

In some embodiments, the audio processor 613 (and mixdown agent 614 and content generator 615) may also comprise software or code that can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system.

Further, any logic or application described herein, including the streaming service 611 and audio processor 613 (and mixdown agent 614 and content generator 615, as discussed below) may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device 1000, or in multiple computing devices in the same computing system 601. Additionally, it is understood that terms such as "application," "service," "system," "engine," "module," and so on may be interchangeable and are not intended to be limiting.

Turning back to FIG. 5, according to some embodiments, the analysis of Step 504 can involve analysis of the audio file, and subsequent storage in a dedicated database(s) for retrieval at a later time. The storage, which is based on the content and/or attributes of the audio within the audio file, is the basis from which the organization and cataloging is performed. Thus, having performed the analysis of Step 504, Process 500 proceeds to Step 506 where the audio file is organized and cataloged accordingly.

By way of a non-limiting example, according to some embodiments, turning to FIG. 11, Process 1100 provides an embodiment for the determination, detection, retrieval, extraction or otherwise identification of attributes, characteristics, features, deep descriptors, and the like, or some combination thereof, of the audio file. Step 504, and its sub-steps: Steps 1102-1108 of Process 1100, discussed herein. Then, based on this information, the audio file, and its determined information, are cataloged accordingly, as in Step 506 (and its sub-steps: Steps 1110-1114 of Process 1100). Thus, in some embodiments as discussed below, Process 1100 provides embodiments for the performance of Steps 504-506 of Process 500 of FIG. 5.

Process 1100 begins with Step 1102 where the identified audio file(s) from Step 502 is parsed, from which portions (e.g., slices) of the audio file are identified. Such portions, for example, can include, but are not limited to, samples of the audio, normalized versions of the audio, segmentation of the audio, extracted audio and melodic portions, and the like.

In Step 1102, the parsed files are analyzed. As mentioned above, such analysis can involve analysis and identification of data/metadata by any known or to be known audio (or media) file analysis technique, algorithm, classifier or mechanism, including, but not limited to, ANNs, CNNs, computer vision, Bayesian network analysis, Hidden Markov Models, data mining, feature vector analysis, logical model and/or tree analysis, data mining, and the like.

Based on the analysis, information related to, but not limited to, melodic features, tempo regions, amplitudes, beats per minute (BPM), fade ins/outs, features of individual stems (using source separation), dominant frequency ranges, structure, beat positions, onsets, harmonics, speakers/singer quantity, background noise, energy level, pitch, silence rates, duration, sonic genre classification (multiple classifications with or without weights), loudness, key, meter, gender of vocals (male or female), arrangement (music with vocal or instrumental), mood (happiness and sadness), character (acousticness and electronicness), danceability, harmony (tonal or atonal), attitude (aggressiveness and chillness), environmentalness (music or environmental sounds), environmental sonic genre (multiple classifications with or without weights), and/or any other acoustic or DSP metric, value or characteristic that is identifiable from an audio file, or some combination thereof, can be determined, derived, extracted or otherwise identified, as in Step 1106.

In some embodiments, for example, voice portions, portions attributed to certain instruments (e.g., drums), and/or other information related to types of audio characteristics (e.g., melody, volume, rhythm, and the like), can be extracted from the portions as a by-product or result of the computerized analysis.

In some embodiments, the audio information can further include the information provided upon identification of the audio (e.g., from Step 502—for example, the type and/or identifier). This, as discussed below, can be is used to route information to specific databases and/or provide an indication of a format type of storage in such databases.

According to some embodiments, the audio features, characteristics and/or attributes of the audio file identified from at least FIGS. 6-10 (and FIGS. 13-17 discussed below), can also be identified in Steps 1104-1106, and form the basis of such audio information, which can be further processed, as discussed below. For example, information indicating "posts", overlays, mixdown portions, and the like, as discussed above, can be identified and/or extracted from the audio file.

In Step 1108, the type of audio information is analyzed. In some embodiments, this analysis dictates or forms the basis for which database (e.g., identity and type of database), or which portion of a multidimensional database, the audio information is stored in, and in which manner, form and quantity of the audio information is stored therein. For purposes of this discussion, multiple databases are discussed; however, one of skill in the art would recognize that a multidimensional database would function in a similar manner.

In Step 1110, the appropriate database for the audio information is identified. For example, for the vocals and/or other "content" of an audio file, a content database (e.g., a content digest) is identified. In some embodiments, this type of database is capable of being subject to a query that searches for content based on a variety of factors that can include, but are not limited to, a search string, context variables, using a key-value pair as the basis for identifying and retrieving the audio file's vocal information, for example, and the like.

In Step 1112, the format of the storage within the identified database is identified. For example, if the database is a vector database for storing the audio features as a n-dimensional feature vector, then this information would serve as the format identified in Step 1110. An example of this is provided below in relation to FIG. 12.

In another non-limiting example, if the content database only stores key-value pairs as references/pointers to remotely located content, then this information can be identified and leveraged, as discussed below in relation to FIG. 12. In some embodiments, the storage of key-value pairs can correspond to individual or a set of features. In some embodiments, the storage of key-value pairs can be associated with a stored, compressed version of a content descriptor record as a value, with a contextualized client identifier as the composite key (e.g., version+partner+type+client identifier).

In Step 1114, the audio information, either an appropriate portion or a version of it, is formatted and stored accordingly. In some embodiments, Step 1114 can include identification of particular portions of audio information for storage in particular databases. That is, for example, as mentioned above, the content (e.g., vocals) of the audio information can be extracted and formatted as a representative key-value pair, which can be stored in a content database that is capable of being queried. In another example, the deep features are identified as being suitable for a vector database. Therefore, these deep features of the audio can be subject to known or to be known vectorization techniques, and stored as a feature vector in a vector database.

In some embodiments, the storage of Step 1114 can involve enabling access to a remote location for a user (e.g., a third party provider) to access to analyzed audio file portions/data (e.g., an FTP site or any other suitable repository).

FIG. 12 provides Process 1200 for further processing of an audio file. Such processing can be a sub-process of Steps 504 and 506's operations, as mentioned above. In some embodiments, Process 1200 can be executed as part of Processes 500 and/or 1100 or can be a separate process that executes as a mechanism for analyzing and cataloging audio files and their data/metadata.

Process 1200 begins with Step 1202 where the audio file is parsed (and analyzed) in a similar manner as discussed above in relation to Steps 504 and 1102. In Step 1204, a set of predetermined portions of the audio file are identified, and such portions correspond to a predetermined time period of the audio file.

In some embodiments, Step 1204 involves performing fingerprinting algorithms (e.g., hash functions) that enable the reduction of large data files to shorter, representative files (e.g., MBs to KBs of data) which survive and are capable of being subject to encoding at different bit rates.

For example, two portions of the audio file can be identified, and they correspond to the first n seconds (e.g., 2 minutes or 120 seconds) of the audio file, and the last n seconds of the file. These are referred to as "fingerprints" and "toeprints", respectively. An example of such sections can be viewed as candidate sections 705 at the beginning (front) and end of audio file 700 of FIG. 7A.

In Step 1206, these portions are analyzed, and as a result, in Step 1208, metadata related to the portions features and/or attributes are identified (e.g., the metadata of each portion). In some embodiments, Step 1208 also further identifies the distance between the end of the first portion (e.g., fingerprint) and the beginning of the second portion (e.g., toeprint).

In some embodiments, the analysis of Step 1206 involves feature extraction. In some embodiments, the analysis can be performed in a similar manner, and according to similar mechanisms discussed above in relation to Steps 504 and 1104, discussed above.

Continuing with Process 1200, in Step 1210, a fingerprint database of hashes (or fingerprints) is identified (e.g., using MusicBrainz™ or other similar resources in some embodiments, as a non-limiting example). In some embodiments, this identification leads to a search of the database based on the information from the fingerprints (or hashes) of the audio file (e.g., from Step 1204).

As a result of the search, groupings (or clusters, used interchangeably) are determined. The groupings can be based on a time-synched matching between the hashes of the audio file and the data stored in the fingerprint database identified in Step 1210. The groupings, in some embodiments, involve, but are not limited to, IDs for i) fingerprints; ii) groups; and/or iii) families.

In some embodiments, the fingerprint ID information, which provides a unique ID, corresponds to information identified from or associated with the audio file. In some embodiments, the group ID provides an identifier that indicates non-duplicative (e.g., subject to a de-dupe) data for other files having the same audio. For example, the identification from a collection of audio of the same music track (e.g., the recorded track versus a live version, track recorded by artist X and the same track recorded by artist Y, for example). In some embodiments, the group ID can reference songs that comprise the same content, but are offset by certain time stamps (e.g., the same song on different compilations/albums, where the "time between tracks" may be different in order to realize consistent musical flow that is specific to the respective compilation or album). In some embodiments, the family ID corresponds to similar recordings, and/or those that are from the same album, artist, time period, and the like, and/or correspond to the same song (e.g., song recorded by different artists).

In some embodiments, similarity data, from group IDs and/or family IDs, can be utilized as a way to reduce the computational load on performing the disclosed analysis. For files within the same grouping (e.g., group ID and/or family ID), one file may be analyzed, and its findings can be applied to its corresponding counterpart songs within a grouping. This enables a grouping of files to effectively be analyzed via the processing of a single file for the group. In some embodiments, further processing may be required to gather/collect basic information about the other files in the group. In some embodiments, when combined with an offset for the group (e.g., a fingerprint offset), audio features for the group as well as each individual file can determined therefrom.

This information is then stored in a fingerprint database associated with engine 400. Step 1214. This information can be stored within a look-up table (LUT) and/or as vector information, as discussed above. In some LUT embodiments, engine 400 can utilize an inverted index to identify portions of the fingerprint, such that quality matches for a grouping is derived from the number of fingerprint segments matched by a piece of content. Thus, the more it matches (ultimately in sequence), the more similar the files are considered to be. In some embodiments, the hash information can be stored as key-values, as discussed above.

For example, Steps 1212-1214 involve comparing hash information from the audio file (determined from Step 1208) to information stored in the database identified in Step 1210. This comparison, which can be performed via neural network analysis (e.g., CNN), for example, can indicate similarities of the audio data/metadata, which can lead to the groupings discussed above (items i, ii, and/or iii of the groupings).

In some embodiments, engine 400 can identify duration of the audio elements, distance between the fingerprint and toeprint, and presence of signal on the outside bounds of the fingerprint offsets. In some embodiments, this can be utilized to identify if there is audio material before the fingerprint or after the toeprint which would cause the file to be unique compared to others with similar fingerprints and toeprints.

Turning back to FIG. 5, having organized and cataloged the data and metadata for the audio file(s), Process 500 turns to the processing of configuring and managing the audio file (and other files), as in Step 508.

Figure 14D:
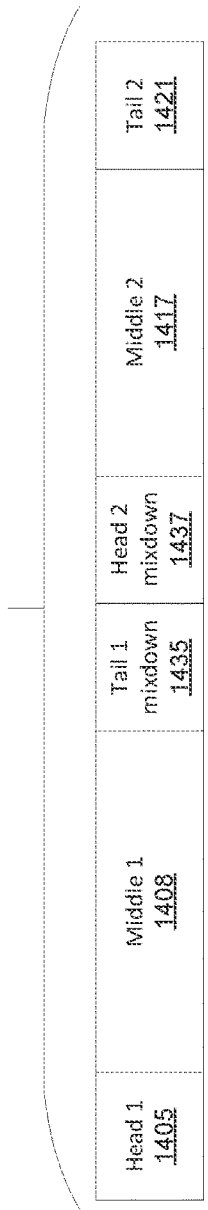
Figure 14E:
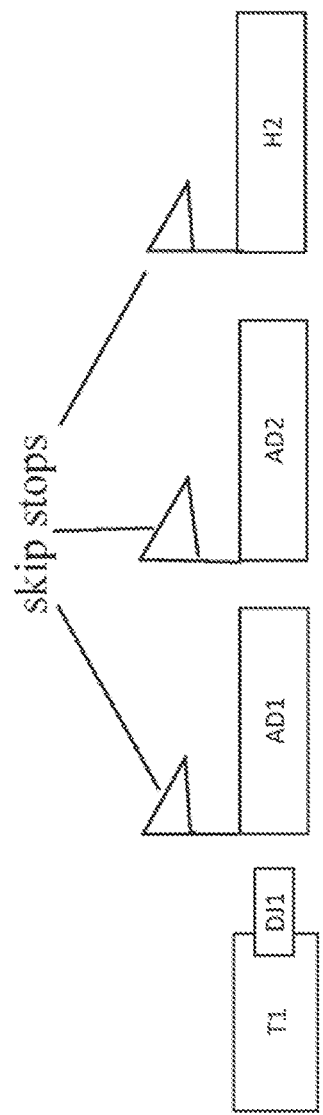
Figure 15:
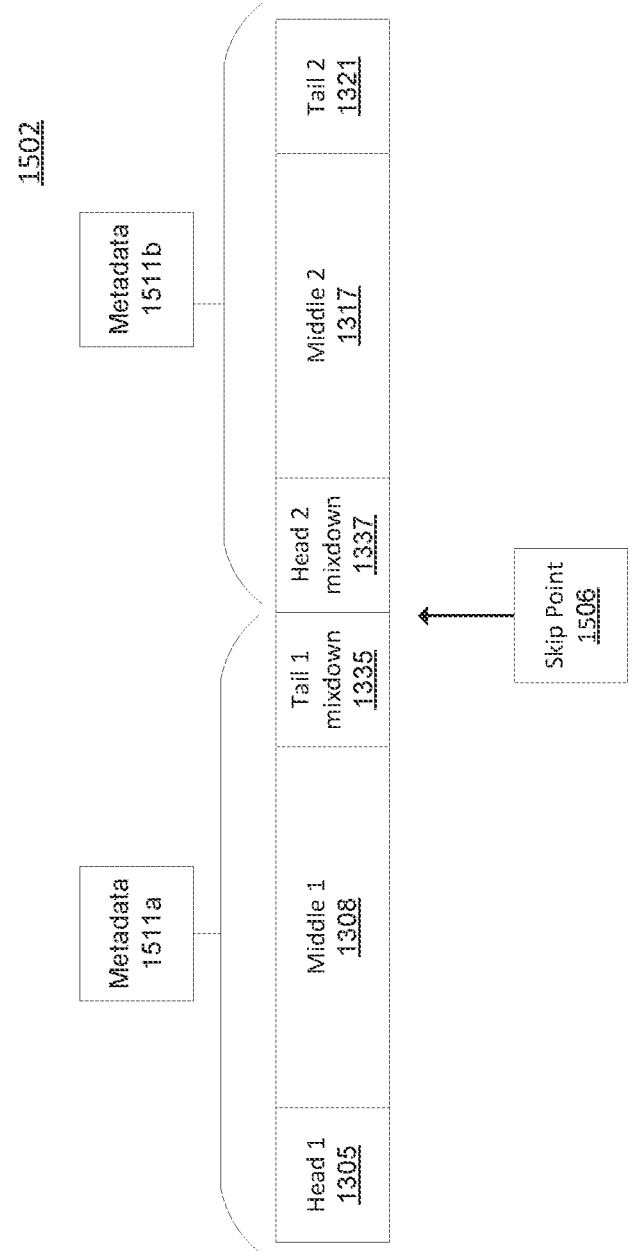
FIG. 15 is a diagram illustrating an example of an output file according to some embodiments of the present disclosure.

According to some embodiments, the processing performed in accordance with Step 508 is detailed according to the following disclosure of FIGS. 13-15, which provides systems and methods for processing files for playback.

By way of background, streaming services (e.g., service 611) allow a client device to select a digital station and receive an encoded audio stream that the client device can decode and play back via one or more speakers or other devices. Such streaming services can include a server-based application that selects different audio files from a library and transmits them for playback in serial order.

As discussed herein in relation to at least FIGS. 13-15, the disclosed framework addresses these technical shortcomings by providing systems and methods for a cloud-based or client-based mixdown agent 614 that can process audio files before they are streamed as part of an audio streaming service or otherwise distributed as desired. The mixdown agent 614 is illustrated in FIGS. 6 and 10, as discussed above, whereby its functionality is discussed herein.

In some embodiments, the mixdown agent 614 can process the tail portion of an initial audio file with the head portion of a subsequent audio file to generate mixed versions of the same so that the initial audio file and subsequent audio file are played back seamlessly (without perceptible interruption or completely uninterrupted as desired.) These embodiments can provide gapless stitching of audio files. Some embodiments can use heads and tails and then leverage gapless, sequential playback to build a contiguous audio experience (with head, middle, and tail sequences). Some embodiments can also use full tracks and render a succession of full files that, when played gaplessly, give the impression of a contiguous live stream. Some embodiments can also output a continuous live stream of audio that is encoded and delivered as a live experience (using various streaming techniques, such as, but not limited to, Real-Time Streaming Protocol (RTSP) or Hypertext Transfer Protocol (HTTP) Live Stream (HLS), for example). Some embodiments can also be used to simply produce completed audio experiences—for example, a fully produced ad or something longer like a podcast. Some embodiments combine multiple elements and produce them into a single file, feed or stream. Some embodiments reduce the number of files required on the user end. By way of a non-limiting example, according to some embodiments, two or more audio files, and some or all their relevant information, can be combined from multiple files and saved to fewer files, or even one file.

According to some embodiments, as discussed herein, the mixdown agent 614 performs one or more of the following functions: overlaying additional content during the mixdown process, inserting metadata into the output file, and inserting one or more index points (also known as skip stops) which have metadata associated with them in the output file. Some embodiments include the ability to process smaller portions of audio files, thereby reducing computing resources demands. In some embodiments, selecting specific portions of the audio files to process by the mixdown agent 614 provides improved listening experiences as opposed to arbitrarily crossfading consecutive audio files. Additionally, some embodiments provide more than just mixdown functionality by providing a fully featured production agent that does mixing, timing, overlays, processing, and the like. Some embodiments can render one or more personalized advertisements from multiple audio elements.

According to some embodiments, the mixdown agent 614 can comprise a software application or module that communicates with the streaming service 611. In some embodiments, the mixdown agent 614 can employ one or more APIs (or other suitable interfaces) to plug into the streaming service, receive control commands and data from the streaming service 611 and generate output data that is transmitted to the streaming service 611 (as illustrated in FIG. 6, for example).

According to some embodiments, the functionality described with respect to the mixdown agent 614 can be implemented in a client device. In some embodiments, the functionality can be implemented via a server, collection of servers, and/or a distributed CDN.

In some embodiments, a mixdown agent 614 can supplement and/or replace some of the functionality provided by the streaming service 611 (as discussed above). In some embodiments, mixdown agent 614 can receive the playlist constructed by the streaming service 611. In some embodiments, the mixdown agent 614 can receive the audio files and any overlay content 628 as an input. The mixdown agent 614 processes the audio files to generate an output file. The output file can then be transmitted to the streaming service 611, whether it is then transmitted to a client device. FIG. 13, discussed below, provides detailed examples of the functionality of some embodiments of the mixdown agent 614.

FIG. 13 is a flowchart illustrating an example of the operations of the mixdown agent 614 according to some embodiments of the present disclosure. It is understood that the flowchart of FIG. 13 provides merely an example of the many different types of functional arrangements that can be employed to implement the operation of the mixdown agent described herein. In addition, the flowchart can be implemented as modules that can be configured to facilitate orchestration. Some embodiments can run on clients as well—iOS, Android, M, PC, raspberry pi, and the like. Some embodiments can provide some or all of the functionality described herein in a retail or other environment where a small (for example, US$30) computer is mixing down and producing the audio that you hear in the store or other location. Some embodiments can also be implemented in a non-network environment or in an environment that has periodic access to the network. Some embodiments can provide a wide variety of production functions including, without limitation, ad generation, podcast generation, and the like.

Process 1300 begins with Step 1302, where the mixdown agent 614 obtains mixdown parameters. In some embodiments, the mixdown parameters are a "recipe" for how the mixdown agent should process the inputs. For example, in some embodiments, the mixdown parameters can include an identification of one or more audio processes. An audio process can be, for example, a frequency filter, limiter, a cross fade process, an attenuation process, an equalization process, a dynamics processing, or any other audio process. The parameters can include instructions such as whether to insert one or more skip stops or metadata into an output.

In Step 1304, the mixdown agent 614 obtains audio data. The audio data can be multiple audio files from an audio library 122 or can be an audio stream compiled from multiple audio files. According to some embodiments, the audio data includes a first audio item (or audio file, used interchangeably) (e.g., a song) and a second audio item (e.g., another song) to be played in consecutive order. In addition, the audio data can include overlay content 628.

In Step 1306, the mixdown agent 614 generates mixdown output files. In some embodiments, the mixdown output files are generated by processing the tail portion of a first audio item and the head portion of a second audio item. For example, Step 1306 can include a "slicer" operation, as discussed above, that parses and extracts separate portions (or clips) from input audio items. In some embodiments, each clip is a portion (e.g., head, middle, tail) that can be handled as a separate file.

Some embodiments join multiple items into a larger whole or simply to build a single item that consists of multiple parts. By way of a non-limiting example, an audio ad campaign can be produced by some embodiments where an announcer reads a car manufacturer ad, then reads all the names and addresses for every local dealer, and a producer puts together a collection of different genres of background music. Some embodiments can create specific advertisements for every dealer and every possible music format by following the instructions passed to it to combine the relevant elements (e.g., main ad read, West Texas dealer address, and country background music.)

In Step 1308, the mixdown agent 614 generates an output stream. In some embodiments, mixdown agent 614 combines the audio files into an output stream that can be received and played by a client. The mixdown agent 614 can encode the output stream. For example, the mixdown agent may apply data compression to prepare it for transmission over a network 116. Such transmission can involve sending to a requesting user/entity or hosting on a network resource location for retrieval.

In Step 1310, the mixdown agent 614 transmits the output stream. The output stream can be transmitted to the streaming service 611 or to the client 633. This can be implemented as a module designed to move the output to a specified location (e.g., to a network location or to send to a device of a user/entity).

FIGS. 14A-14E are diagrams illustrating examples of two audio items that are processed by the mixdown agent 614. While one of skill in the art would understand that multiple audio items (or files) can be processed by agent 614, for purposes of clarity and explanation, only two items will be discussed herein; however, one of skill in the art would recognize that the disclosed functionality can be implemented on any number of files/items without departing from the scope of the instant disclosure.

FIG. 14A shows a first audio item 1401 and a second audio item 1402. These audio items 1401, 1402 can be obtained by accessing an audio library 622 or by extracting them from an audio stream. The mixdown agent 614 can receive the audio items from the audio library 612 or from the streaming service 611.

The audio items 1401, 1402 can be formatted as audio files. They represent two audio items that are scheduled to be played back in consecutive order. For example, they can represent consecutive songs on a playlist dynamically generated by a streaming service 611. In some embodiments, the items 1401,1402 can be audio files that are stored in a "smart folder," as discussed below.

The mixdown agent 614 processes each audio item 1401, 1402 to generate a head portion 1405, 1414, a middle portion 1408, 1417, and a tail portion 1411, 1421. The head portion 1405, 1414 represents the beginning of the audio item 1401, 1402 while the tail portion 1411, 1421 represents the end of the audio item 1401, 1402. In some embodiments, the middle portion 1408, 1417 is positioned in the middle of the audio item and represents a majority of the audio item in terms of length or size.

These portions described above can be determined using AI, machine learning, DSP, or a wide variety of other algorithmic techniques. For example, a CNN model(s) can be implemented to perform the agent 614 processing.

In some embodiments, these portions represent moments in the audio item 1401, 1402 having significant melodic changes such as, for example, the intro or outro to a song. The transition from the head portion 1405, 1414 to the middle portion 1408, 1417 can represent where a song's intro ends and where vocals or one or more other melodic or significant components of a song begin. The transition from the middle portion 1408, 1417 to the tail portion 1411, 1421 can represent where the melody or vocals end and an outro begins in some embodiments.

In some embodiments, the transitions described above can be identified by analyzing the zero-crossings of a wave form and/or areas where audio amplitude is relatively low between to zero-crossings. This technique enables subsequent processing to reduce the occurrence of an audible discontinuity (e.g., perceived as a pop effect, audible "click" or some other sonic artifact). In some embodiments, each portion of the audio file can be formatted as a separate file that is capable of being independently processed. In some embodiments, these separate files can be rendered (e.g., for example, only audio portions of audio files can be part of an output stream, as discussed herein).

In FIG. 14B, the tail portion 1411 of the first audio item 1401 and the head portion 1414 of the second audio item 1414 are selected for processing. The mixdown agent 614 performs a mixdown process 1432 to generate a mixed down tail portion 1435 and mixed down head portion 1437. The mixdown process 1432 can operate according to specified parameters obtained as part of the mixdown agent's 114 operation. This can include the operations described above in relation to FIG. 13.

For example, the mixdown process 1432 can overlap (partially or completely), crossfade, or otherwise mix a portion of the tail portion 1411 and head portion 1414. The result are two separate audio files being the mixed down tail portion 1435 and mixed down head portion 1437. The mixed down versions can be shorter than the versions prior to the mixdown process. For example, in some embodiments, the mixed down tail portion 1435 can be shorter than the tail portion 1411. In addition, the mixed down tail portion 1435 can include some content from the head portion 1414. Some embodiments apply smart limiting between the one or more files of one or more file types. This enables the avoidance of unwanted audio artifacts caused by overflow conditions when multiple (e.g., two) digital signals are mixed together. In some embodiments, this involves a "brickwall" limiter that can store its envelope follower state so that it can be re-initialized to avoid audio discontinuities or other effects between any desired portions including, without limitation, the middle and tail in a subsequent mixdown.

According to some embodiments, the mixdown process adds overlay content 628 that is mixed into one or both of the mixed down tail portion 1435 and mixed down head portion 1437. According to some embodiments, an entire file can be utilized without the portioning discussed herein, as one of skill in the art would understand from the instant disclosure. The overlay content 628 can be identified by the streaming service 611 such that it is tailored or otherwise targeted to the user. In this respect, the mixdown agent 614 enables customized overlay content to be presented to a user as one audio (or other file type) item 1401 seamlessly transitions into a consecutive audio (or other file type) item 1402

FIG. 14C shows the first audio item 1401 and second audio item 1402 being updated to include the mixed down tail portion 1435 and mixed down head portion 1437. The mixdown agent 614 can stitch or otherwise combine the separate audio file portions to generate an updated first audio item 1401 and updated second audio item 1402.

FIG. 14D shows the updated first audio item 1401 and updated second audio item 1402 combined into an output file 1445. The output file 1445 includes the content of the first audio item 1401 and second audio item 1402 so that they can be played back consecutively in a seamless manner.

According to some embodiments, the larger portions of the tracks (e.g., the middles 1408,1417) can be pre-processed and pre-encoded. In such embodiments, when doing the mixdowns, only the heads and tails of content are to be considered (e.g., for mixing them together, adding content, slicing up, and then encoding the output (to AAC, MP3, and the like)). In some embodiments, the delivery of the mixdowns, therefore, can involve transmission to a fileserver (or CDN) that delivers the files for gapless reassembly at the client-end.

FIG. 14E shows a diagram illustrating an example of audio items that are processed by the mixdown agent 614 according to some embodiments. Some embodiments comprise a mixer H2. Some embodiments comprise overlays of DJ content, as discussed above. Some embodiments include elements that can be blended. In some embodiments, volume can be leveled. Some embodiments comprise one or more skip stops, as discussed below. As discussed below, skip stops can be located anywhere within an audio file, as they provide for an interactive experience where users can move around an audio timeline.

FIG. 15 is a diagram illustrating an example of an output file according to some embodiments of the present disclosure. FIG. 15 depicts an audio output file 1502. The output file 1502 can be any audio output file processed by the mixdown agent such as the output file 1445 described in FIG. 14D. According to embodiments, the mixdown agent 614 is configured to insert one or more skip stops 1506 between the mixed down tail portion 1435 and mixed down head portion 1437. In some embodiments, the skip stop 1506 can be provided as a separate file including a timestamp or it can be included as metadata in the output file 1502. In some embodiments, the data/metadata related to a skip stop 1506 can be appended to a file or included as header information.

The skip stop 1506 indicates a time position in the output file 1502 that should be indicative of a beginning point in the event a skip command is received prior to the skip stop 1506. In the event a skip command is received, the system can navigate to the skip stop and resume playback. In some embodiments, the original head portion 1414 is played instead of the mixed down head portion 1437 when navigating to the skip stop 1506. In these embodiments, the user will experience listening to the second audio item 1402 as if there was no mixdown process 1432.

FIG. 15 also shows an embodiment of the mixdown agent 614 inserting metadata 1511 into the output file 1502. Metadata 1511 (e.g., 1511a and/or 1511b) can include the artist, title, or other information about the audio item. The first audio item 1401 can correspond to first metadata 1511a and the second audio item can correspond to second metadata 1511b. When the audio player 637 of the client device 633 plays back the output file 1502, it can recognize and process the metadata 1511. In response, the client device 633 can render for display the contents reflected in the metadata.

According to some embodiments, the mixdown agent 614 can implement a single channel gapless technique where a first and second audio item 1401, 1402 can be selected, and then where the first audio item 1401 should overlap the second audio item 1402 can be selected as well. In some embodiments, the head portion and a tail portion can be re-rendered for each transition and/or content moment.

In some embodiments, the mixdown agent 614 is configured to receive a first audio item 1401, a second audio item 1402, and a plurality of overlay content items. Overlay content items can include a channel for sound effects, audio from an interview, a radio advertisement, and other sources of audio content. The mixdown agent 614 can combine one or more of the plurality of overlay content items into a single file. This single file can be reused when mixing down different audio items. Additionally, overlay content libraries can be generated and efficiently used in large numbers of subsequent applications. Some embodiments provide functionality similar to a "render form" where a cloud-enabled service is scaled to create new audio (mixdowns) at virtually any desired scale.

Turning back to FIG. 5, having configured and managed the audio file (and other files) (e.g., Step 508), Process 500 turns to the performance of generating experiences. Step 510.

Figure 16:
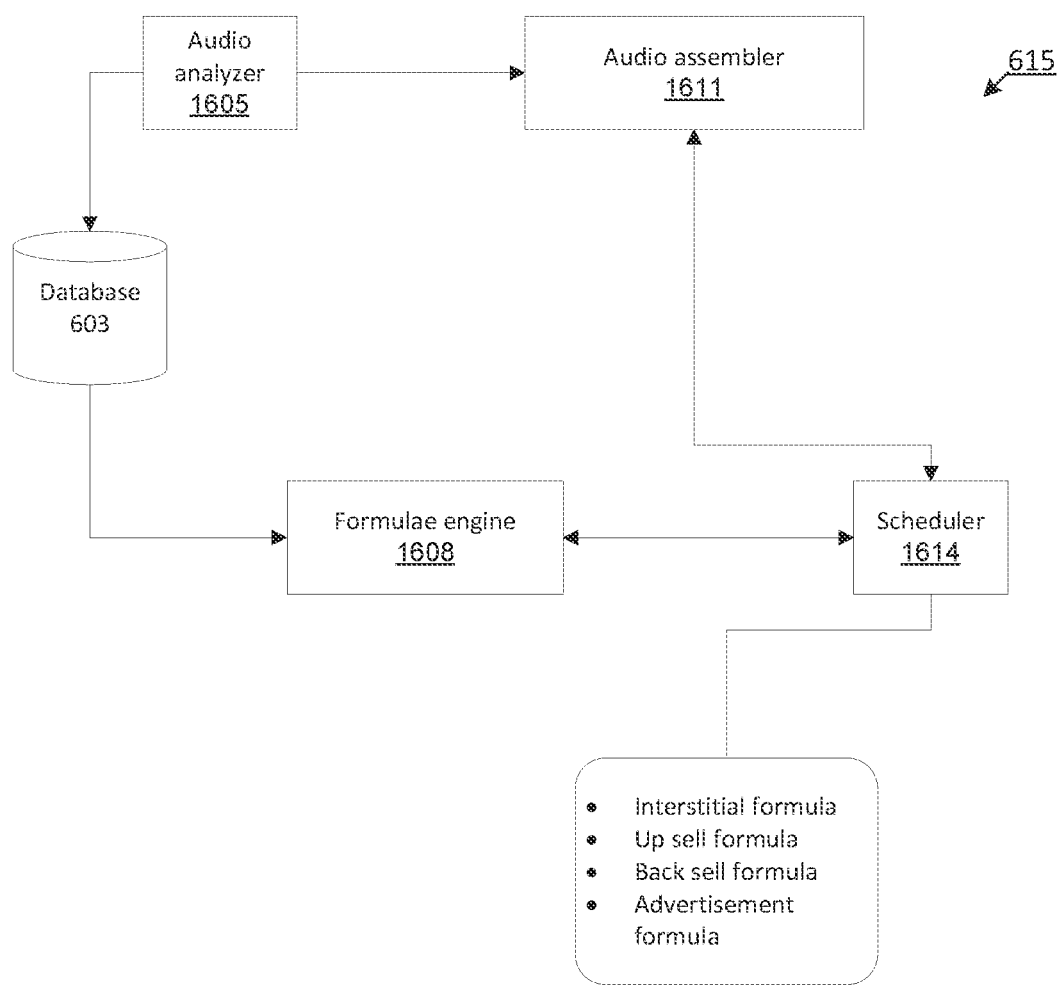
FIG. 16 is a diagram illustrating a non-limiting example embodiment of the operations of a content generator according to some embodiments of the present disclosure.
Figure 17:
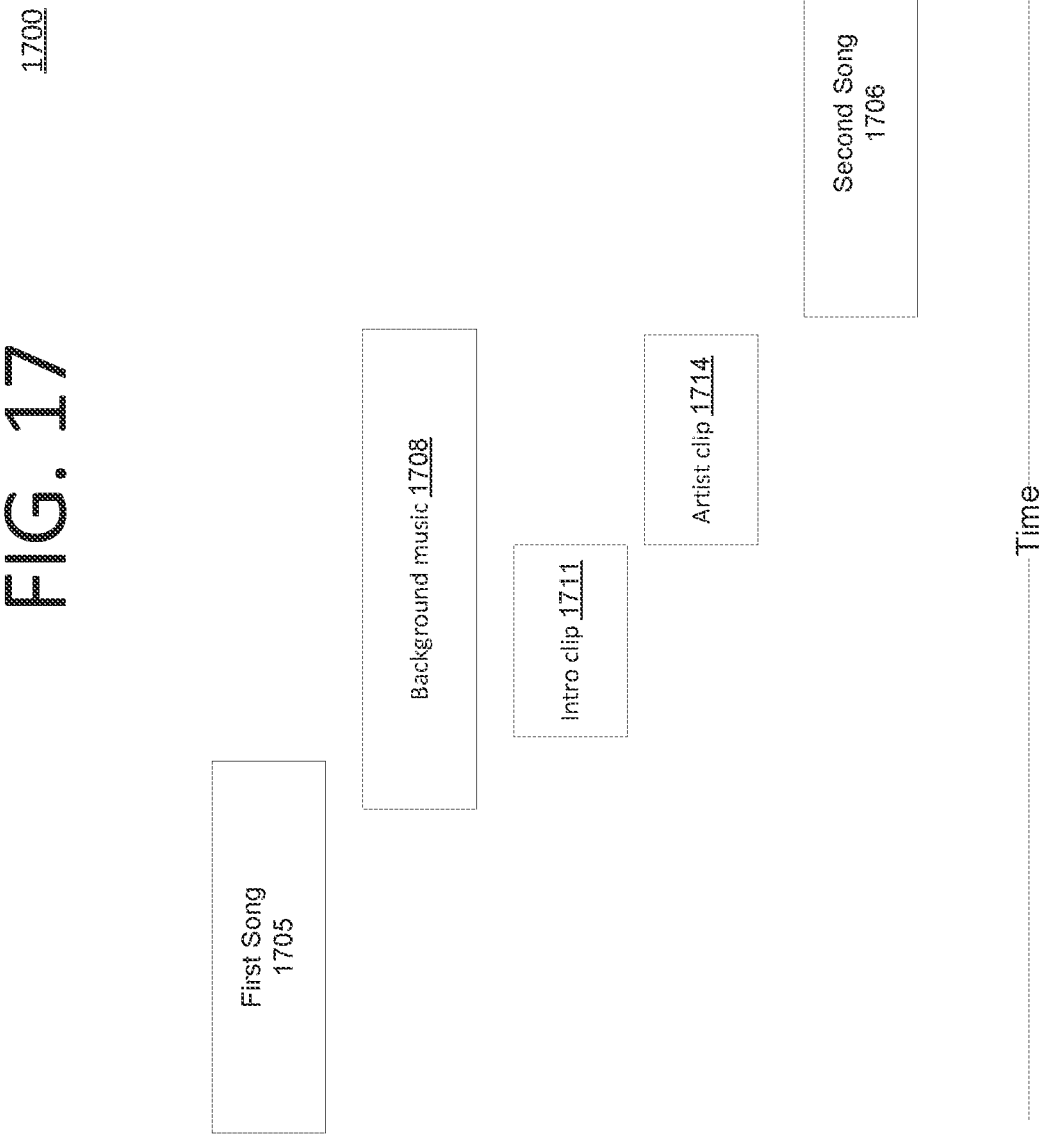
FIG. 17 is a diagram illustrating a non-limiting example embodiment of audio data processing via the content generator according to some embodiments of the present disclosure.

According to some embodiments, the processing of Step 508 can be performed via the systems and methods discussed in relation to FIGS. 16 and 17. According to some embodiments, Step 508 can involve the generation of playlists, broadcasts, stations, and the like, as discussed in relation to FIG. 18, which is an embodiment of a detailed flow of embodiments discussed in relation to FIGS. 16 and 17.

Turning to the embodiments of the systems and methods disclosed in reference to FIGS. 16-17, some embodiments provide for using, among other variable, content attributes, historical decisions, user attributes and preferences, contextual attributes and dynamic descriptions of outcome possibilities to make decisions and produce audio or other content moments and experiences.

Some embodiments dynamically generate high-level instructions that describe how to produce an audio experience, which may be a single experience (that can be short or long) or can describe how to produce a succession of experiences that are chained together. Some embodiments make song mixes, podcasts, advertisements, and/or other content as desired. Some embodiments enable production of one or more lengthy (or practically perpetual) audio or video experiences through dynamic querying of databases that can include producer and/or user preferences regarding a large number of attributes and subjects, followed by dynamic scripting of content completely or substantially consistent with the preferences. In some embodiments, such preferences can be adjusted for different experiences, producers, users and branding goals.

High quality content generation typically requires significant manual inputs from skilled personnel. As just one non-limiting example, audio production services allow a client device to select a digital station and receive an encoded audio stream that the client device can decode and playback via one or more speakers. Audio production services may include a server-based application that selects different audio files from a library and transmits them for playback in serial order. Prior art systems lack the ability to dynamically query and script content experiences to produce a desirable experience, and are not designed for personalized or contextualized delivery on today's content services Some embodiments use an intelligent and dynamic querying and scripting engine to assemble and generate either directives for stand-alone experiences (e.g., podcast, ad) or directives for the contextual insertion or overlay of content between/on two songs (or other content elements.) Some other embodiments use an intelligent and dynamic querying and scripting engine to assemble and content such as playlists, albums, advertisements, podcasts or other related or standalone content as well as content to be inserted between audio events, such as, for example a transition between two songs.

The content generator 615 is utilized for the performance of the systems and methods of FIGS. 16-17, as illustrated in FIGS. 6 and 10.

As illustrated in FIG. 6, streaming service 611 can function as a production service (referred to herein as "production service" 611 for purposes of the description of FIGS. 16-17). The production service 611 and content generator 615 mentioned above are components executed on the computing system 601. These components may generate data and store the data on the database 603 and/or access the contents of the database 603. The production service 611 may be an application implemented on one or more web-servers that enable users to subscribe, create, edit, and manage standalone or sequences of content. In some embodiments, the production service 611 receives user input and generates an encoded audio stream that is transmitted over the network 616 for playback.

In some embodiments, the content generator 615 can produce podcasts, create audio tracks for videos, create advertisements for playback on a wide variety of platforms, create music playlists and associated content, and the like. Some embodiments provide standalone content contextualized for a personalized and desirable experience.

The content generator 615 can comprise a software application or modules that communicate with the production service 611. The content generator 615 may employ one or more APIs to plug into the production service, receive control commands and data from the production service 611 and generate output data that is transmitted to the production service 611.

In some embodiments, the data stored in the database 603 includes an audio library 622. In some embodiments, as mentioned above, the library 622 can be partitioned into, or include portions (e.g., structures) of a primary content library and a secondary content library. In some embodiments, asset features, as discussed below, can be housed/stored in library 622 (in either primary and/or secondary libraries) or store separately in a portion of database 603.

According to some embodiments, the primary content library may be a library of audio files that a user may wish to stream. The primary content library may comprise, among other forms/types of data/metadata, several song files, music files, podcasts, or other relatively long audio files that make up substantive content for entertainment purposes. The secondary content library is a series of clips or pre-recordings that may be informative or support the presentation of information. This may include, for example, audio clips announcing the radio station, advertisements, informative recordings, sound effects, and background music, and the like.

In some embodiments, the audio library 622, inclusive of the primary content library and secondary content library, may be embodied as a set of databases with features that describe audio files and/or audio portions of video files, e.g., representations of the files themselves. A library may include metadata such as artist, title, album information, chapter information, and the like.

In some embodiments, asset features include data generated from analyzing the contents of the primary content library and secondary content library. In some embodiments, asset features are generated using machine learning or other artificial intelligence algorithms. The asset features may indicate information about an audio item such as the key of the music, the chords at the beginning and ends of songs, the degree that two pieces of audio are in tune, the energy level of an audio item, or any other attribute or quality about an audio or video item. In some embodiments, the asset features can also include metadata that is added at the time of import or any other point thereafter by humans or other sources or processes. In some embodiments, this also can include the text of the content (if speech) as extracted by ML/DSP processes or any other data extracted or produced by selected sources or processes, as discussed above.

In some embodiments, the MI/DSP processing can involve, but is not limited to, performing source separation (if/when determined necessary) to isolate the human voice component—then this portion is analyzed by a speech to text engine/model. This allows the identification of the text of content that may have music and other elements mixed in with it (e.g., an advertisement). In some embodiments, the text provides assistance for sentiment analysis as well as basic search indexing. In some embodiments, the human voice component may include singing which can be analyzed by a speech to text engine/model to obtain lyrics.

According to some embodiments, the content generator 615 is configured to enhance the functionality provided by the production service 611. The content generator 615 may receive the audio items selected by the production service 611. In addition, the content generator 615 may obtain audio items from the secondary content library 625. In some embodiments, production service 611 may provide conditions on which to configure the operation of the content generator.

In some embodiments, content generator 615 identifies one or more audio items from the secondary content library, assembles them as desired including overlapping, interaction, and any other desired effects or results, and inserts the assembled content.

In some embodiments, one or more concordance rules are used once or multiple times. One non-limiting example of a concordance rule is when the system detects an ad signal and an upsell opportunity, the system combines two moments together. In some embodiments, this may be processed by a "combinational formulae", which can be generalized for more than one formulae, or for specifically identified formulae scenarios (e.g., ads and upsells, for example).

In some embodiments, the content generator 615 can access a database of rules (which may range from simple to complex) and deliver content rotating through rules and/or formulae (or formulas, used interchangeably) as desired. For example, formulae can indicate where to insert (or "stitch-in" via a mixdown, as discussed above) an advertisement, branding audio or other voice-over content. For example, a formula may indicate that at predetermined times or intervals, additional content is to be "stitched" in, as discussed herein in more detail.

In some embodiments, a formula is made up of one or more elements. These elements can directly reference a particular piece of content, but this is less common in some embodiments. In many embodiments, they represent a dynamic query for content. For example, a query can be executed for a voiceover liner that is appropriate to a particular listening context and within a certain margin of the incoming song's energy level. In some embodiments, a formulae engine retrieves all of the content that matches that criteria and further evaluates it to pick the best one; e.g., the one heard least recently, that is closest in energy level, and that fits best over the introduction of the incoming song. This way, in some embodiments, the dynamic formula retrieves and ranks different content based on the time and context that it is being executed in.

In some embodiments, the rules database can comprise any database including, without limitation, an object-oriented database which can be dynamically queried. In some embodiments, dynamic querying and scripting can provide a highly personalized experience for users. Some embodiments of formatics are flexible and can be optimized using feedback from various conventional sources. Some embodiments comprise runtime criteria and control how content events are dispensed overtime.

Some embodiments first schedule content using formulae which have first been tested to see if they work well. In some embodiments, the scheduling is enabled working down or up a list of formulae. Next, in some embodiments, content is dispensed out over time for given users and their respective histories. Next, in some embodiments, directives are translated, yielding instructions such as playlist ordering or other desired content sequencing.

Some embodiments enable highly customized content treatment using formatics to tweak factors and weigh relevant evidence or desired characteristics. In some embodiments, the weighting can also account for surrounding content and/or discrete audio elements, which can be used in rendering the formulae. Some non-limiting examples include being more aggressive regarding voiceover or other content generation, modifications regarding acceptable relative amplitude between adjacent or overlaid content, and recombining sources with softer vocals or other elements. Some embodiments use rotating rules such as an ad injection or branding event as predetermined periods of time elapse.

Some embodiments provide a system for generating and managing audio moments, wherein new software code is not needed for each new concept for desired effect. Some embodiments provide the flexibility and capability to create virtually any desired content, in ways that are not dogmatic and can take the place of human input if desired. Some embodiments provide the ability to automatically generate complete content for radio or other media stations or outlets using predetermined and/or flexible formulae to provide a great user experience.

FIG. 16 illustrates a non-limiting example of the content generator 615 according to some embodiments of the present disclosure. FIG. 16 depicts the audio analyzer 1605, formulae engine 1608, audio assembler 1611 and scheduler 1614. Each of these components may be separate modules that make up the content generator 615. In some embodiments, these modules may be embedded into the production service 611.

In some embodiments, the audio assembler 1608 transitions from one audio item to another audio item. The audio assembler 1608 may generate the playlist of primary audio content or receive the playlist from the production service. In some embodiments, the audio analyzer 1605 performs feature extraction and classifies asset features to describe aspects of audio items. The audio analyzer 1605 may be configured to operate on any content such as, for example, content from the primary content library and from the secondary content library of audio library 625 (as discussed above). In some embodiments, the audio analyzer 205 generates asset features and stores them in a database 603.

In some embodiments, the scheduler 1614 identifies different conditions to drive the selection of one or more formulae. In some embodiments, a formula may be a data structure that is dynamically generated from a script. In some embodiments, a formula may comprise a set of rules or executable instructions providing information and control as to how to generate content.

Non-limiting examples of formulae include an interstitial formula, an upsell formula, a back-sell formula, an advertisement formula, or any other formulae for arranging a sequence of audio files. In some embodiments, an interstitial formulae may provide information about a listening context, or a name of the listening context. In some embodiments, an interstitial formula may include a combination of a music embedded effects and an audio clip stating the listening context's name. A listening context can be, but is not limited to, a radio station, playlist, a streaming service, content channel, area of a service, or other organizing factor that is used to differentiate an area where a set of behaviors apply.

In some embodiments, an upsell formula may include an introduction clip and a subsequent clip stating the artist's name. This is referred to as "concatenation", and it uses not only the intent of the pieces (and the individual pieces' relationships with the content around it), but also an analysis of speech rhythm and cadence to ensure that the timings, amplitudes, and vocal inflections for the elements are well-matched and observed. An introduction clip may be an audio recording of a voice saying "up next is". A back sell formula may include a summary clip followed by a clip stating the artist's name. A summary clip may be an audio recording of a voice saying, "you just listened to". An advertisement formula may comprise one or more clips for presenting an advertisement.

In some embodiments, scheduler 1614 selects a particular formula or formulae based on conditions. In some embodiments, conditions may indicate when to generate content based on the secondary content library of library 625 and what kind of content to generate. The production service 611 may provide specific conditions to the scheduler 1614. For example, the condition may indicate that the content generator 615 should generate content towards the end of a particular song and the content should be an advertisement.

In some embodiments, once the scheduler 1614 selects a formula or formulae based on the conditions, the formulae engine 1608 identifies what audio items to play and in what order to play them, where such clips are taken from the secondary content library of library 625. In some embodiments, the formulae engine 1608 may select clips based on the asset features of audio items. In some embodiments, the formulae engine 1608 may analyze metadata or tags associated with audio items to also obtain information about the audio item.

In some embodiments, using metadata and/or asset features, the formulae engine 1608 identifies one or more audio clips from a secondary content library of library 625 that best matches or is consistent with the two audio items. This functionality is described in further detail with respect to FIG. 3.

In some embodiments, the formulae engine 1608 orders the audio items that are selected from the secondary content library of library 625. In some embodiments, the audio items may partially or fully overlap with one another. For example, a background music clip may play overlap with an advertisement clip made up of pure vocals.

Once the formulae engine 1608 identifies the audio items from the secondary content library of library 625 and orders it, the audio assembler 1608 combines the audio items and inserts them at a time position that coincides with the occurrence of an audio event.

In some embodiments, the formulae engine 1608 can process and determine multiple types of moments: start, end, interlineal, overlay, and standalone. Formulae engine 1608, therefore enables the content selection and production, as discussed herein and below.

FIG. 17 illustrates an example of audio data processed according to some embodiments of the present disclosure. Specifically, FIG. 17 shows how the content generator 615 may generate content that is inserted into a stream of content taken from the primary content library of library 625. The example depicted in FIG. 17 is non-limiting, as any number of songs, clips and the like can be interlaced according to the disclosed techniques and mechanisms of the content generator 615.

For example, as illustrated in FIG. 17, a first song 1705 is to be played followed by a second song 1706. Both songs 1705, 1706 may be audio files taken from the primary content library of library 625. These songs 1705, 1706 may be played or streamed by the production service 611. The system determines that the transition from the first song 1705 to the second song 1706 is an audio event is a condition that could use dynamically generated content. In some embodiments, the content generator 615 is instructed to generate content dynamically to be inserted at a time position around this transition event. In the example of FIG. 17, the condition is for upselling the artist associated with the second song 1706.

In some embodiments, based upon these conditions, the scheduler 1614 selects an upsell formulae from a list of predetermined formulae. The formulae engine 1608 is instructed to generate content according to these conditions. In some embodiments, based on one or more asset features associated with the first song 1705 and/or second song 1706, the formulae engine 1608 identifies a background music clip 1708 from the secondary content library of library 625. For example, the asset features may indicate the first song 1705 and/or second song 1706 fall within the jazz musical genre. Accordingly, the formulae engine 1608 selects a background music clip 1708 that is labeled or tagged as jazz.

In some embodiments, the formulae engine 1608 then selects an intro clip 1711. The selected intro clip 1711 may be purely voice with no music such that it is musically compatible with mixing it with the background music clip 1708. In addition, the intro clip 1711 may be selected from one of a plurality of intro clips. The selected intro clip 1711 may correspond to the jazz genre, or match the tempo, pace, or energy level of the first or second song 1705, 1706.

In some embodiments, the formulae engine 1608 then selects an artist clip 1714, which may be a vocal recording of a person saying the artist's name. In this case, the formulae engine 1608 may access metadata associated with the second song 1706 to determine the artist and then identify the appropriate artist clip 1714.

In some embodiments, the audio assembler 1611 may then combine the background music clip 1708, intro clip 1711, and artist clip 1714, each of which was selected from the secondary content library. In some embodiments, these audio items may be combined so that the background music clip 1708 overlaps with the intro clip 1711 and artist clip 1714. In addition, in some embodiments, the intro clip 1711 is positioned immediately before the artist clip 1714 to create a seamless transition. In some embodiments, content generated from the background music clip 1708, intro clip 1711, and artist clip 1714 is then inserted at the audio event, which is the transition from the first song 1705 to the second song 1706. In some embodiments, the generated content (e.g., the combination of background music clip 1708, intro clip 1711, and artist clip 1714) overlaps at least partially with the end of the first song 1705 and/or beginning of the second song 1706.

When stitching together songs and clips, some embodiments are directed to identifying time positions for where two audio files should overlap to improve the user's music listening experience. For example, an audio recording for an advertisement selected from the secondary content library of library 625 should overlap with a song selected from a primary content library of library 625 in a manner that does not interfere with the listening experience. For example, the audio of an advertisement should not interfere with the vocals of a song. Furthermore, the audio advertisement can end immediately before a musical moment (e.g., introduction of vocals, introduction of an instrument, and the like) of a song begins. This can create musical continuity that improves the listening experience.

In some embodiments, a musical moment can be determined using computational musicology. For example, a song's waveform or frequency transformation may be analyzed to identify its beat structure, frequency signatures, instrument entry points, or vocal entry points, and the like. A song's waveform being analyzed can be divided into parts including, for example, individual instruments, drums, vocals, or any other component. The beat of a song can also be determined to identify the transitions between measures. A DSP/ML can be used to identify such musical moments. These musical moments can be used to identify points of overlap when stitching content together.

In some embodiments, trained machine learning models, such as CNNs, for example, can be used to determine musical movements, as discussed above. In this case, features in a song can be identified or extracted and then labeled to create training data. The training data may be used to train a classifier to identify moments in a song where overlays or other additional content or effects are permitted and where changes are not permitted.

In some embodiments, the scheduler 1614 can implement a series of rules for generating content made up of audio from the primary content library and secondary content library of library 625. These rules may be used to create variety and avoid repetition when dynamically generating content to be played by a production service 611. The secondary content library of library 625 may comprise a plurality of audio clips and phrases. Voice talent can manually record such audio clips. The content of a clip can be recorded several times to correspond to different energy levels, intensities. Several recordings can be made using different words to convey a similar message. This creates a library comprising variation to make the dynamically generated content sound less mechanical or more organic. For example, one clip can say "up next is" while another clip can say "next is". In addition, these clips may be recorded by different people and/or with different inflections and/or different energy levels. In some embodiments, it can be specified and/or determined whether voices, for example (or other characteristics) of the particular fragments match or do not match.

In some embodiments, scheduler 1614 can leverage play history (for a single user, group of users, or content channel/ station) via rules that distribute individual content items across time. This way, the same audio is not being consistently rendered, thereby creating a redundant listening experience. In some embodiments, content can be distributed as part of a grouping for a predetermined period of time, for particular users, for particular contexts, and the like; therefore groups of content can be played together in instances where deemed to fit the schedule; however, rules exist which prohibit their constant rendering thereby avoiding overplay which can lead to user exhaustion.

In some embodiments, the audio clips of the secondary content library of library 625 may be compressed or stretched while preserving pitch to obtain time variations among each clip. For example, a single recording of a person saying, "You are listening to classic rock radio" that last 5 seconds may be compressed to be 4 seconds or stretched to be 6 seconds while preserving the pitch. Thus, one clip can be replicated into several clips with varying audio qualities.

When implementing rules, the scheduler 1611 may use opportunistic rules and/or rotational rules. Opportunistic rules can focus on frequently checking if a particular clip or category of clips can be used when generating dynamic content. Rotational rules operate according to a sequence of clips to try and operate according to additional rules for advancing through an ordered list.

In some embodiments, the scheduler operates according to an ordered checklist to play a particular clip or type of clip. If there is no opportunity to play a particular clip or type of clip, it continues to the next item on the checklist until a clip or type of clip can be played. The scheduler can check off a played clip or type of clip and then proceeds to the top of the list at the next opportunity.

As an example, in some embodiments, a user can listen to a content channel called "Artist A" where the channel plays songs relating to a musical artist referred to as "A". A content channel can be, for example, a streaming service station. This channel setting can be referred to as a listening context, which can be defined by one or more descriptors (e.g., name and identifier) that uniquely identifies the unique location of a listening experience within a broader hierarchy of listening experiences. Depending on the listening context, the scheduler 1614 can operate according to rules to identify the next clip or clips to use when dynamically generating content. The rules can specify an energy level, clip length, a formula, a memory parameter, or any other parameter.

In some embodiments, regarding the energy level, each clip can be tagged to reflect the clips' energy level. Thus, a clip type may be a particular energy level. The clip length can refer to the duration of the clip. For example, depending on the musical moments of a first song 1705 (e.g., outgoing song) and the second song 1706 (e.g., incoming song) for which the clip is to be inserted, the duration can vary. The first song 1705 can have a long outro making it a good candidate for overlaying a longer clip over the outro. The memory parameter can refer to how long the system should wait before playing a particular clip or type of clip. In some embodiments, memory parameter can refer to how long a user's play history is saved.

In some embodiments, the rules can limit the dynamic creation of upselling content to improve the listening experience. Or, in some embodiments, an upselling formula can take priority to play more frequently if an administrator of the system desires.

In some embodiments, rules can be used to vary the content selected from the secondary content library of library 625. In some embodiments, rules can be used to prevent the repetition of certain types of clips for a specified period of time (e.g., using a memory parameter). In some embodiments, rules can be used to prioritize certain types of clips over others or play a particular clip whenever an opportunity presents itself.

Some embodiments provide directives or other input to inform playback either directly or being passed through a second service that provides more precise timings and other relevant information if desired. One non-limiting example of a second service that can work synergistically with the innovations described herein is described in U.S. Pat. No. 10,409,546, the content of which is incorporated herein in its entirety. Such directives or other information can be rendered at one or more unicast playback clients or via a cloud agent in a broadcast studio for terrestrial satellite, or internet Multicast delivery. One non-limiting example of a second service that can work synergistically with the innovations described herein is described in U.S. Pat. No. 10,509,622, the content of which is incorporated herein in its entirety.

Figure 18:
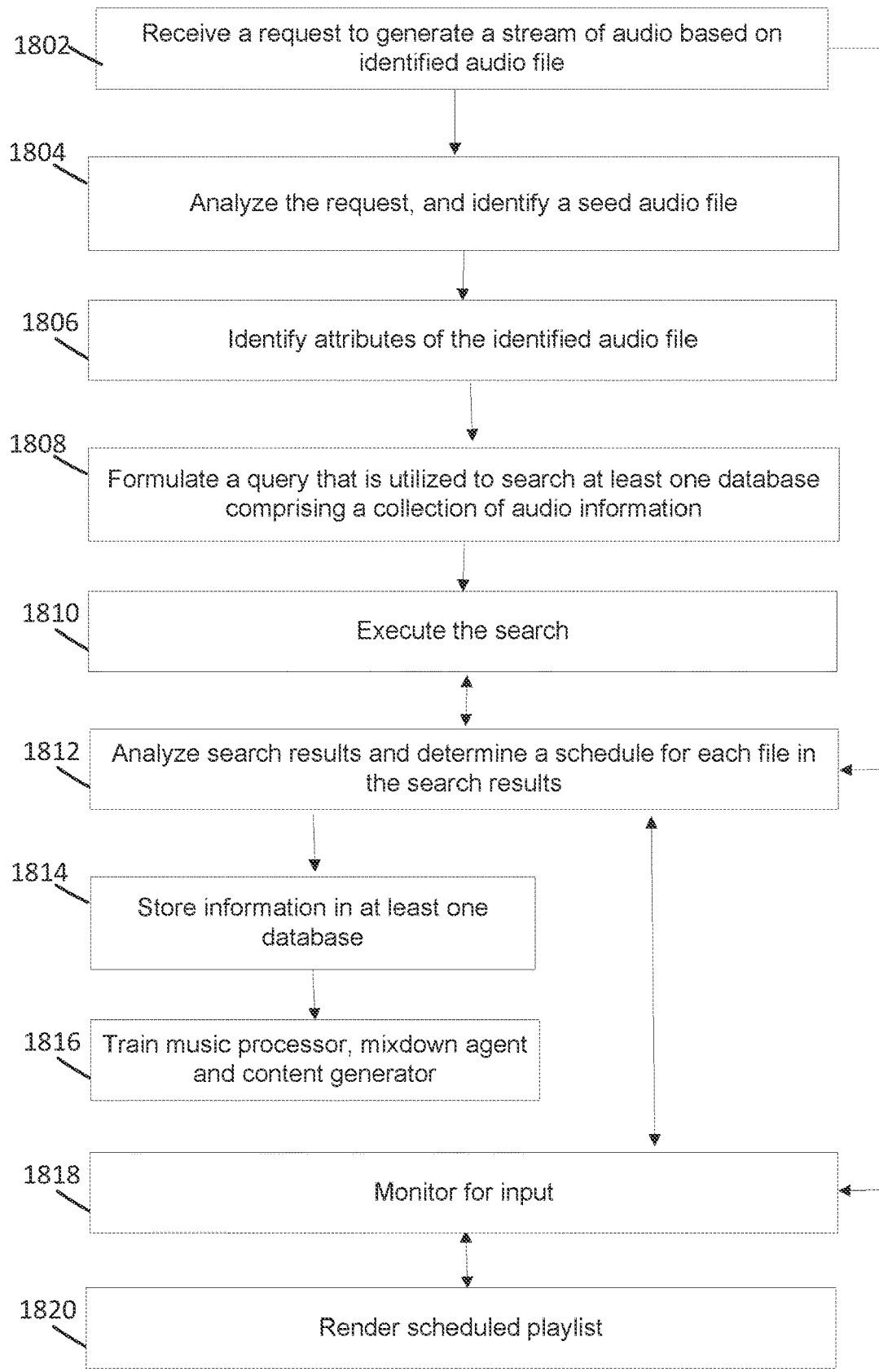
FIG. 18 is flowchart detailing a non-limiting example embodiment according to some embodiments of the present disclosure.

Turning to FIG. 18, Process 1800 details embodiments of steps performed by engine 400, including executed logic performed at least by content generator 615, for providing renderable content. Process 1800 provides non-limiting example embodiments of the disclosed framework's operation upon the uploading, storing and cataloging of audio files (e.g., performed via the preceding figures). That is, the operations of Process 1800 operate in-line with creating a renderable audio experience for a user or set of users.

In some embodiments, a user can be a third-party content provider that is requesting the creation of a playlist. In some embodiments, the request can include content that can be used as a seed file. In some embodiments, the request can include a directive upon which the playlist is created (e.g., information about an audio file, such as a context), as discussed in more detail below. In some embodiments, the user can be a user of a third-party platform, or a user that is a subscriber to such platform or a subscriber to a service that is provided by the disclosed framework.

According to some embodiments, Process 1800 involves the creation of a playlist as a renderable audio experience for a user in response to a request from a third party. In Step 1802, the request comprises information related to an audio file. In some embodiments, the information can include, but is not limited to, a name of the audio file, an identifier for the audio file, the actual audio file, a pointer or network address of the audio file (e.g., a uniform resource locator (URL)), name of an artist, name of a genre, a feeling, a mood, or other form of emotion or feeling that is captured by a piece of music, a length, a time period, a context (e.g., what is the song about, what is the song referencing), at least a portion of the lyrics, an album name, album cover art and the like, or some combination thereof.

In some embodiments, Process 1800 can be applied to a situation where the request comprises a set of audio files, which are to be arranged at the discretion of engine 400—this is performed in a similar manner as discussed herein, where the audio files included in, or referenced in the request, are leveraged in a similar manner as discussed below in relation to the identified audio file from Step 1802. Thus, one of skill in the art would recognize that the quantity of audio files received at the onset of Process 1800 would not change the scope or functionality, as engine 400 is capable of creating a user experience based on seed content, where the content can reference a single audio file or a feed of audio files (e.g., a playlist).

In some embodiments, the request in Step 1802 can further include information related to a setting for rendering the audio file and its subsequently identified audio files, whether they are voice overs, advertisements, or other songs. Such information can include, but is not limited to, asset features and conditions that drive the formulae engine 1608 and scheduler 1614, as discussed above. For example, the request can reference that it is December, and that holiday-type music is requested. Rather than play Christmas-music, for example, the requestor desires upbeat, "happy" music—therefore, in this example, the request can include information indicating an energy level value and/or a minimum threshold for BPM, with lyrics having a "context" that corresponds to a "happy" mood.

In some embodiments, these settings can be provided or applied dynamically, either as the playlist is being compiled and/or as it is rendered, as discussed in more detail below (and illustrated via the feedback loops/lines in FIG. 18).

In Step 1804, upon receiving the request, engine 400 analyzes the request to identify the information which will form the seed upon which a playlist is compiled. In some embodiments, when the request either includes the seed audio file, or directly references it, Step 1804 involves parsing the request and identifying the relevant information related to the seed file.

In some embodiments, the request may include information referencing an audio file (e.g., metadata related to a song, as mentioned above). In such embodiments, Step 1804 can include analyzing the contextual information included therein by any known or to be known analysis technique, algorithm, classifier or mechanism, including, but not limited to, ANNs, CNNs and computer vision, for example. This analysis enables engine 400 to determine or identify which audio file is being referenced.

In Step 1806, the attributes of the audio file identified in Steps 1802-1804 are identified. The identification of these attributes can be performed using any of the above techniques discussed in relation to at least Step 504 of FIG. 5.

In some embodiments, Step 1806 results in the identification of attributes, which include, but are not limited to, melodic features, tempo regions, amplitudes, beats per minute (BPM), fade ins/outs, features of individual stems (using source separation), dominant frequency ranges, structure, beat positions, onsets, harmonics, speakers/singer quantity, background noise, energy level, pitch, silence rates, duration, sonic genre classification (multiple classifications with or without weights), loudness, key, meter, gender of vocals (male or female), arrangement (music with vocal or instrumental), mood (happiness and sadness), character (acousticness and electronicness), danceability, harmony (tonal or atonal), attitude (aggressiveness and chillness), environmentalness (music or environmental sounds), environmental sonic genre (multiple classifications with or without weights), and/or any other acoustic or DSP metric, value or characteristic that is identifiable from an audio file, or some combination thereof, can be determined, derived, extracted or otherwise identified.

In Step 1808, engine 400 formulates a search query that is utilized to search at least one of the databases discussed above. As mentioned above, these databases include audio information stored as content, key value pairs, feature vectors, and the like. In some embodiment, as discussed above, the databases can function as a multidimensional database(s) that comprises n-dimensional layered data related to specifically formatted and stored audio data and metadata. As mentioned above, in some embodiments, particular types of audio content and/or attributes/features are stored in particular databases.

Therefore, for example, the formulated query in Step 1804 can include string or sequence of queries (e.g., a multidimensional query) that are to be executed in parallel.

For example, the deep features of the audio file (e.g., harmonics, and the like) can be translated into a feature vector for performing a search of a feature database, as performed in a similar manner as discussed above. Additionally, or in the alternative, information related to the context from the audio portion (e.g., text-to-speech) can be subject to Natural Language Processing (NLP) techniques and used to query a content database as a text string.

In some embodiments, the query formulated in Step 1808 can include criteria for guiding the search, such as, but not limited to, a number of audio files to be identified during the search, a type of audio file, a ratio of particular types of files or content within files, and the like.

For example, rather than just returning a number of songs (e.g., 25 songs, for example), the query can request 13 songs, and 12 voice overs, so as to create a music experience, rather than simply a streamed station, as in conventional systems. As mentioned above in relation to at least FIG. 16, the voice over files can include, but are not limited to, advertisements, up-sells, back-sells, interstitials, and the like.

In some embodiments, the query can also include information as to a type of mixdown—for example, which types of transitions, and how long of transitions between files, can impact types of content and/or files that are discovered and/or which databases are searched.

In some embodiments, the query can also include information related to formulae, as discussed above in relation to the implementation of formulae engine 1608 of FIGS. 16-17.

In Step 1810, engine 400 executes a search(es) based on the formulated queries. As mentioned above, the queries are performed on the associated databases that are connected (e.g., either remotely (e.g., in the cloud) or locally (e.g., server information)) to the hosting platform providing/executing engine 400.

In some embodiments, results from certain databases are used to automatically query another database for similar information. For example, upon performing a query of the feature database, a result of a cluster of audio information is identified; however, this information may be compiled as vector information for the audio cluster. For example, audio files with node-features on a respective vector being within a threshold Euclidian distance. This vector information is then leveraged as another query of a content database, for example, as a set of key-value pairs for each item in the cluster, to identify each of the audio files referenced in the cluster that are housed in the digest included in the content database.

In Step 1812, the results are identified, analyzed and a schedule (e.g., a playback data structure) for each file in the search results and the audio file identified in the request (from Step 1802) is determined. According to some embodiments, Step 1812 involves receiving the compiled results, analyzing them (e.g., via scheduler 1614) and determining an order of each audio file identified in the search results, as well as any overlap, if any, between transitions of files while maintaining a gapless interplay between each file (e.g., via mixdown agent 614, as discussed above in relation to FIGS. 13-15).

An example of this is discussed above and illustrated in FIG. 17. In some embodiments, as illustrated in FIG. 17, the order (or sequence) corresponds to when one audio file begins playing respective to when another audio file beings playing (e.g., if one begins playing before another, yet there is overlap with another file), then that file is sequenced prior to the other file in the schedule/order. In some embodiments, if two files begin playing at the same time, then the length of the file will dictate which is ordered first (e.g., the shorter file is first since its rendering will finish first).

In some embodiments, as discussed above in relation to FIGS. 13-17, scheduler 1614 of content generator 615, as well as mixdown agent 614, can execute any known or to be known type of analysis, scheduling and audio blending technique, including, but not limited to, ANNs, CNNs and computer vision (e.g., computer audition).

In Step 1814, the information resultant of the compiled schedule and mixdowns from Step 1812 is stored. The storage is performed in a similar manner as discussed above in relation to at least Step 1808 where appropriate data (e.g., vector data, key-value pairs, context data, for example) is stored in a corresponding database associated with engine 400.

In Step 1816, the AI/machine learning models (e.g., CNNs and classifiers, for example) implemented by engine 400 (e.g., music processor 613, mixdown agent 614 and content generator 615, as discussed above) are then trained, or further trained on this information so that future search results, schedules and mixdowns can be performed more accurately and computationally efficiently.

As mentioned above, the requesting user can provide input, settings or parameters for controlling how the playlist is managed. For example, a value of danceability, happiness, energy, or any other musicality attribute can be set, modified and/or controlled. Thus, in some embodiments, this can involve leveraging these input variables to modify how the audio files are rendered or even ordered. In some embodiments, such modification can cause a re-search (e.g., performance of Step 1810 again. In some embodiments, energy levels or other parameters can be "sculpted" (modified using a configurable curve on a user interface or other methods) over time to yield the desired listening experience.

In some embodiments, Step 1818 can be performed, which monitors for these types of inputs by the requesting user. Should input be provided at this stage, Process 1800 would proceed back to at least Step 1810 or 1812 to search and/or recompile the schedule and mixdowns. In some embodiments, a re-search can be performed, as mentioned above.

Thus, Step 1818, and the double-lines between Steps 1810 and 1812, and 1812 and 1818, as well as the line in the drawing figure from step 1802 to Steps 1812 and 1818 illustrate that parameters can be input by the requesting user as the onset of the request for a playlist, during the compilation operations, or after a playlist is compiled (e.g., as it is playing, for example), where the playlist can then be modified dynamically, in-real time.

Thus, in Step 1820, without receiving further input (from Step 1818), the compiled and scheduled playlist of audio files (e.g., an example of such is illustrated in FIG. 17) is rendered. Such rendering can involve streaming the audio files over a network. In some embodiments, such rendering can involve sending a message(s) to the requesting user that includes information related to the playlist. In some embodiments, the scheduled playlist can be hosted on an FTP site. In some embodiments, the scheduled playlist can be stored in a "smart folder," as discussed below.

In some embodiments, the playlist can act as a data structure for the requesting user to render the audio from his/her location, or over a network. In some embodiments, the playlist can function as a broadcast station, whereby subscribers can tune-in to hear the playback from a dedicated network location. In some embodiments, the playlist can be used for on-demand services, as either a main content portion (e.g., a radio station, news reel, or podcast), or as background information (e.g., to be played while other content is being visibly streamed or played).

In some embodiments, rather than manually creating lists of content or music, Process 1800 can be used to populate an interactive, dynamically updateable virtual collection of content meeting the selection criteria, referred to as a "smart folder". The smart folder acts as a collecting mechanism for audio files that satisfy a user's requested criteria. For example, the request in Step 1802 can include information for collecting songs from an artist X that span 2 minutes to 3 minutes. In another example, a smart folder of voiceover content can be created that collects audio that share the same energy level (e.g., high energy), voiceover talent (e.g., Sally and/or Bob), and playback context (e.g., country music experiences). Process 1800, in a similar manner as discussed above, can leverage smart folders for any purpose where a collection of items may be used. For example, when building a playlist or selecting from one or more pieces of content to use for an experience.

In some embodiments, Step 1802 can include the request providing a reference to a smart folder, whereby the playlist is compiled in a similar manner as discussed above based on the audio files indexed by the smart folder.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method, comprising:
 analyzing, by a computing device, an audio file, and determining attributes of the audio file, the attributes comprising information related to features of the audio file;
 determining, using the computing device, portions of the audio file that are eligible for overlaying and portions that are ineligible;
 obtaining, by the computing device, mixdown parameters, the mixdown parameters including instructions as to whether to insert one or more skip stops or metadata into an output;
 generating, using the computing device, a mixdown between the audio file and a second audio file based on the mixdown parameters, the mixdown comprising ending the second audio file at a post; and
 providing, using the computing device, a rendering of the mixdown.

2. The method of claim 1, wherein post is a soft post.

3. The method of claim 1, wherein the post is a hard post.

4. The method of claim 1, further comprising receiving input parameters from a user, the input parameters corresponding to at least some of the features and characteristics of the audio file.

5. The method of claim 1, further including at least one multidimensional database that comprises a plurality of data structures for specific types of the audio features.

6. The method of claim 1, wherein the mixdown comprises song content and voice-over content.

7. The method of claim 1, wherein the audio file comprises third party content.

8. The method of claim 1, wherein the mixdown parameters include at least one of a frequency filter, a limiter, a cross fade process, an attenuation process, an equalization process, or a dynamics processing.

9. A non-transitory computer-readable storage medium tangibly encoded with computer-executable instructions, that when executed by a computing device, perform a method comprising:
 analyzing, by the computing device, an audio file, and determining attributes of the audio file, the attributes comprising information related to features of the audio file;
 determining, using the computing device, portions of the audio file that are eligible for overlaying and portions that are ineligible;

obtaining, by the computing device, mixdown parameters, the mixdown parameters include instructions as to whether to insert one or more skip stops or metadata into an output;

generating, using the computing device, a mixdown between the audio file and a second audio file based on the mixdown parameters, the mixdown comprising ending the second audio file at a post; and providing, using the computing device, a rendering of the mixdown.

10. The non-transitory computer-readable storage medium of claim 9, wherein post is a soft post.

11. The non-transitory computer-readable storage medium of claim 9, wherein the post is a hard post.

12. The non-transitory computer-readable storage medium of claim 9, further comprising receiving input parameters from a user, the input parameters corresponding to at least some of the features and characteristics of the audio file.

13. The non-transitory computer-readable storage medium of claim 9, further including at least one multidimensional database that comprises a plurality of data structures for specific types of the audio features.

14. The non-transitory computer-readable storage medium of claim 9, wherein the mixdown comprises song content and voice-over content.

15. The non-transitory computer-readable storage medium of claim 9, wherein the audio file comprises third party content.

16. The non-transitory computer-readable storage medium of claim 9, wherein the mixdown parameters include at least one of a frequency filter, a limiter, a cross fade process, an attenuation process, an equalization process, or a dynamics processing.

17. A device comprising:
a processor configured to:
analyze an audio file, and determining attributes of the audio file, the attributes comprising information related to features of the audio file;
determine portions of the audio file that are eligible for overlaying and portions that are ineligible;
obtain mixdown parameters, the mixdown parameters include instructions as to whether to insert one or more skip stops or metadata into an output;
generate a mixdown between the audio file and a second audio file based on the mixdown parameters, the mixdown comprising ending the second audio file at a post; and
provide a rendering of the mixdown.

18. The device of claim 17, wherein the post is one of a soft post or hard post.

* * * * *